(12) United States Patent
Richardson et al.

(10) Patent No.: US 7,003,180 B2
(45) Date of Patent: Feb. 21, 2006

(54) APPARATUS FOR PROVIDING TIMING JITTER TOLERANT OPTICAL MODULATION OF A FIRST SIGNAL BY A SECOND SIGNAL

(75) Inventors: David John Richardson, Southampton (GB); Ju Han Lee, Kyonggi-Do (KR); Morten Ibsen, Southampton (GB); Periklis Petropoulos, Patras (GR); Peh Choing Teh, Perak (MY)

(73) Assignee: The University of Southampton, (GB)

( * ) Notice: Subject to any disclaimer, the term of this patent is extended or adjusted under 35 U.S.C. 154(b) by 120 days.

(21) Appl. No.: 10/472,076

(22) PCT Filed: Mar. 15, 2002

(86) PCT No.: PCT/GB02/01199

§ 371 (c)(1),
(2), (4) Date: Mar. 15, 2004

(87) PCT Pub. No.: WO02/075446

PCT Pub. Date: Sep. 26, 2002

(65) Prior Publication Data

US 2004/0156572 A1    Aug. 12, 2004

(30) Foreign Application Priority Data

Mar. 16, 2001  (GB) .................................... 0106553

(51) Int. Cl.
*G02F 1/01* (2006.01)

(52) U.S. Cl. ............................................ 385/1; 385/27
(58) Field of Classification Search .................... None
See application file for complete search history.

(56) References Cited

FOREIGN PATENT DOCUMENTS

| WO | WO 98/50824 | 11/1998 |
|----|-------------|---------|
| WO | WO 99/21037 | 4/1999 |
| WO | WO 99/55038 | 10/1999 |

(Continued)

OTHER PUBLICATIONS

M. Ibsen et al, "Optimised square passband fibre Bragg grating filter with in-band flat group delay response", Electronics Letters, IEE Stevenage, GB, vol. 34, No. 8, Apr. 16, 1998, pp. 800-802, ISSN: 0013-5194.

P. Petropoulos et al. "Shaprin gof soliton- into rectangular-pulses using a superstructure fibre Bragg grating", OSA Trands in Optics And Photonics Series, vol. 33, Bragg Gratings, Photosensitivity, and Poling in Glass Waveguides, pp. 67-71, 2000, Washington, DC, USA, ISBN: 1-55752-593-5.

(Continued)

*Primary Examiner*—Frank G. Font
*Assistant Examiner*—Eric Wong
(74) *Attorney, Agent, or Firm*—Reidlaw, LLC; John S. Reid

(57) ABSTRACT

Apparatus for providing timing jitter tolerant optical modulation of a first signal by a second signal, the first signal having a first wavelength, the second signal including a plurality of second signal pulses having a second pulse shape and a second wavelength. The apparatus includes a first signal input port, a second signal input port, a coupler, a grating and a non-linear optical device. The apparatus is configured to direct the second signal at the second signal input port to the non-linear optical device via the coupler and the grating, and to direct the first signal at the first signal input port to the non-linear optical device. The grating is a superstructured fibre Bragg grating that converts the second signal pulses into intermediary pulses each having an intermediary pulse shape. The intermediary pulse shape is such that it provides a switching window within the non-linear optical device.

31 Claims, 26 Drawing Sheets

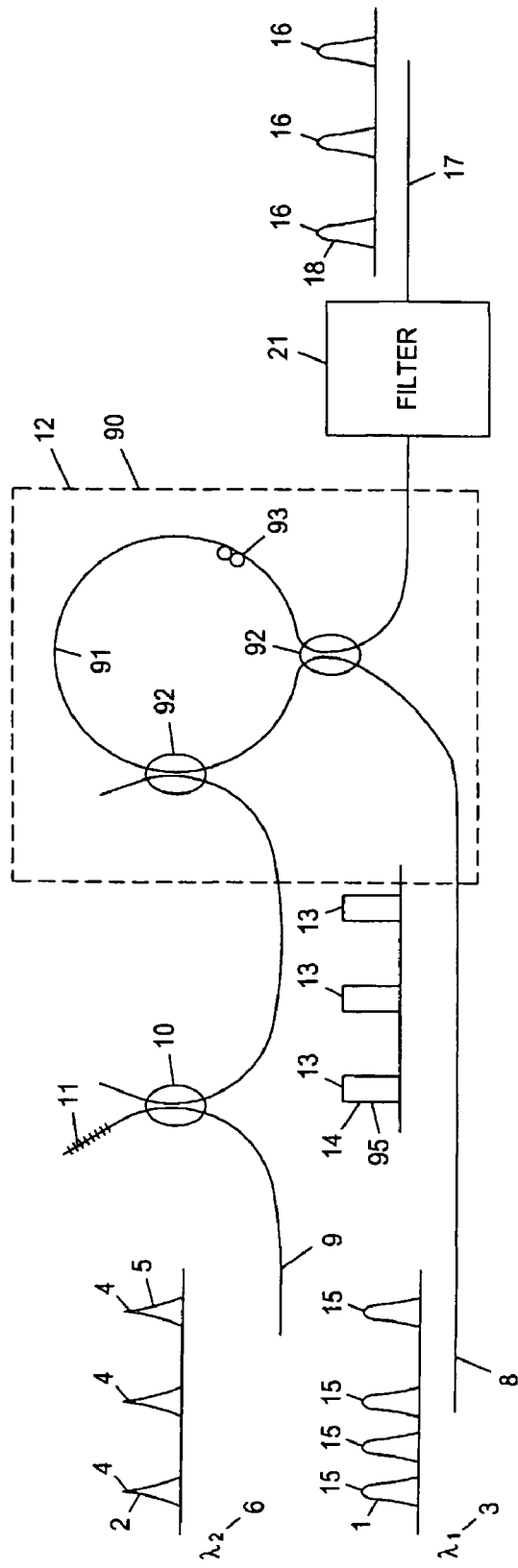
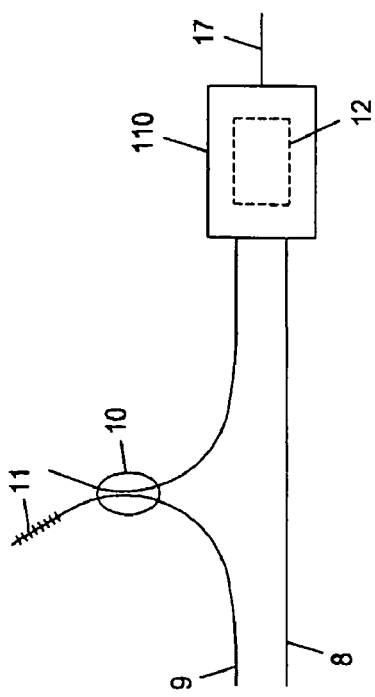
FIG. 9
FIG. 10
FIG. 11

APPARATUS FOR PROVIDING TIMING JITTER TOLERANT OPTICAL MODULATION OF A FIRST SIGNAL BY A SECOND SIGNAL

CROSS REFERENCE TO RELATED APPLICATIONS

The application being filed herewith is a U.S. National Stage filing under 35 U.S.C. § 371 (et seq.) of Patent Cooperation Treaty ("PCT") Patent Application serial number PCT/GB02/01199, filed 15 Mar., 2002, which in turn claims priority to United Kingdom (Great Britain) Patent Application Serial Number GB 0106553.1, filed 16 Mar. 2001.

FIELD OF THE INVENTION

This invention relates to optical modulators, which incorporate pulse-shaping fibre Bragg gratings, and which are tolerant to timing jitter.

BACKGROUND OF THE INVENTION

In order to 'synthesize' a particular optical pulse form one needs to be able to reliably define the amplitude and phase profile of an optical field. The general approach is to generate pulses with a well-defined pulse form and to then pass the pulse through some pulse shaping element with an appropriately designed transfer function to re-phase and re-shape the incident spectrum so as to obtain the desired output optical field. The pulse-shaping element can have a pure linear response such as a filter with a suitably complex response, or might additionally include a non-linear element, e.g. an optical fibre or an aperiodic quasi-phase matched structure, to allow the controlled generation of frequency components outside the frequency spectrum of the input pulse-form.

The most commonly used technique is a simple linear filtering technique in which the frequency components of a short pulse are spatially dispersed using bulk gratings, and then filtered by means of amplitude and phase-masks positioned within a Fourier optical 4 f set-up. Microlithographically fabricated spatial-masks, segmented liquid crystal modulators, or acousto-optic modulators have been used as spatial filters, the latter two approaches allowing for programmability and dynamic reconfigurability of the pulse shaping response. Whilst impressive results are possible with this approach, the hardware itself is somewhat bulky, lossy and expensive and does not lend itself to ready integration with waveguide devices. These issues have prompted the search for other technical approaches to the problem such as the use of arrayed waveguide gratings, and arrays of fibre delay lines.

Single channel data rates approaching the Tbit/s level have now been reported for optical time division multiplexing (OTDM) systems. These single channel data rates place increased demands and tolerances on the techniques used to multiplex and demultiplex the optical data bits. Consider for example the case of optical demultiplexing. As OTDM data rates increase, and the pulses used get correspondingly shorter, the synchronization requirements placed on the locally generated pulses used to control the switch operation can become a limiting practical issue. The key to reducing time jitter tolerance in such devices is to establish a rectangular temporal switching window. This reduces the absolute accuracy for temporal bit alignment and provides optimal resilience to timing jitter-induced errors. Fibre based non-linear optical loop mirror (NOLM) demultiplexing schemes that provide both good, ultra-fast performance and tolerance to timing-jitter of either or both of the control and data signals have been demonstrated previously. These schemes use the difference in group velocity and the resultant 'walk-off' between the control and data signals within the non-linear optical device to define the rectangular switching window. This consequently requires tight specification and control of both the data and signal wavelengths, and the dispersion characteristics of the fibre. Whilst this approach is applicable to fibre based switches, it is complex and cannot be applied to switches based on highly non-linear semiconductors and within which there are no appreciable dispersive propagation effects over the length scales of relevance. Simple, robust techniques that can help reduce time jitter tolerances and that are applicable to a variety of switching mechanisms are thus of great interest.

It is an aim of the present invention to obviate or reduce the above mentioned problems.

SUMMARY OF THE INVENTION

According to one non-limiting embodiment of the present invention, there is provided apparatus for providing timing jitter tolerant optical modulation of a first signal by a second signal, the first signal having a first wavelength, the second signal comprising a plurality of second signal pulses having a second pulse shape and a second wavelength, and the apparatus comprising a first signal input port, a second signal input port, a coupler, a grating and a non-linear optical device, the apparatus being configured to direct the second signal at the second signal input port to the non-linear optical device via the coupler and the grating, and to direct the first signal at the first signal input port to the non-linear optical device; the grating being a superstructured fibre Bragg grating that converts the second signal pulses into intermediary pulses each having an intermediary pulse shape; and the intermediary pulse shape being such that it provides a switching window within the non-linear optical device.

The first signal can comprise a plurality of first signal pulses. The first signal can be a continuous wave signal such as an un-modulated laser beam. The switching window can be rectangular, Gaussian, or any other user-defined shape.

In one embodiment of the invention, the first signal comprises a plurality of first signal pulses, the grating is defined by a grating impulse response, the intermediary pulse shape is defined by the convolution of the second pulse shape and the grating impulse response, and the switching window is a substantially rectangular switching window which provides tolerance to a variation in arrival time of the first signal pulse at the first input port and the second signal pulse at the second input port substantially equal to the width of the rectangular switching window.

In another embodiment of the invention, the first signal comprises a plurality of first signal pulses each having a width, the grating is defined by a grating impulse response, the intermediary pulse shape is defined by the convolution of the second pulse shape and the grating impulse response, the grating being such that the intermediary pulse shape is a substantially rectangular pulse, and in which the apparatus has a tolerance to a variation in arrival time of the first pulse at the first input port and the pulse at the second input port substantially equal to the width of the substantially rectangular pulse minus the width of the first signal pulse.

The apparatus of the invention may be one in which the coupler is a circulator. The coupler may be an optical fibre coupler.

The apparatus may comprise an optical switch, the optical switch being such that it comprises the non-linear optical device.

The non-linear optical device may be a holey fibre. The holey fibre may comprise glass. The glass may be silica, a silicate glass, or a compound glass. Alternatively, the holey fibre may comprise a polymer.

The holey fibre may comprise a core and a cladding, in which the cladding comprises a plurality of holes arranged around the core, and in which the core has a diameter less than 10 um. The core may have a diameter less than 5 um. The core may have a diameter less than 2 um.

The holey fibre may comprise a dopant, the dopant being selected from the group comprising Ytterbium, Erbium, Neodymium, Praseodymium, Thulium, Samarium, Holmium Dysprosium, Tin, Germanium, Phosphorous, Aluminium, Boron, Antimony, Uranium, Gold, Silver, Bismuth, Lead, a transition metal, and a semiconductor. The above list of elements includes associated chemical compounds of the element, and in particular all-oxide forms.

The non-linear optical device may be, or may comprise, a semiconductor optical amplifier.

The non-linear optical device may comprise a lithium niobate channel waveguide, or a lithium niobate planar waveguide.

The non-linear optical device may comprise a periodically poled lithium niobate channel waveguide or a periodically poled lithium niobate planar waveguide.

The non-linear optical device may be an optical switch, a holey fibre, a poled-fibre, a potassium titanyl phosphate (KTP) or other crystalline waveguide, a periodically poled KTP or other crystalline waveguide, a non-linear optical loop mirror, a Kerr gate, an optical fibre, a non-linear amplifying loop mirror, or a non-linear optical modulator.

The optical non-linearity used within the non-linear optical device may be based on second-order ($\chi(2)$), or third-order ($\chi(3)$) non-linear effects. The specific manifestation/use of the non-linearity might be in terms of Self-Phase Modulation (SPM), Cross-Phase Modulation (CPM), Four-Wave Mixing (FWM), parametric frequency conversion, second harmonic generation, third harmonic generation, sum frequency generation, difference frequency generation, supercontinuum generation, cascaded second order effects, or some combination thereof. Other optical non-linearites that might be used include Raman and Brillouin effects, cross gain modulation and two photon absorption.

The apparatus may be configured to modulate the first signal.

The apparatus may be configured to demultiplex the first signal.

The apparatus may comprise an actively mode-locked fibre laser.

The apparatus may comprise an interferometer comprising a first arm and a second arm, and in which the first arm comprises the non-linear optical device.

The apparatus may comprise a filter, and in which the filter is a wavelength selective filter.

The apparatus may comprise a polarizing element, and in which the polarizing element is a polarizer or a polarization beam splitter.

The apparatus may comprise a clock generator. The clock generator may be a short-pulse generator selected from the group comprising a mode-locked fibre laser, an actively mode-locked fibre laser, a generator comprising an electro-absorption modulator and a laser, a generator comprising an electro-optic modulator and a laser, and a gain-switched laser diode.

The clock generator may comprise a means for pulse compression such as dispersion compensator fibre, a chirped fibre Bragg grating, a dispersion decreasing fibre, an optical amplifier, a Raman amplifier, an optical switch, an optical pulse compressor, or some combination of these devices.

The apparatus may comprise a plurality of non-linear optical devices and be configured to direct the second signal at the second signal input port to each of the non-linear optical devices. The apparatus may be configured as an optical multiplexer. The apparatus may be configured as an optical demultiplexer. The apparatus may be configured as an inverse multiplexer. The apparatus may comprise a switch and a control input for controlling the switch.

BRIEF DESCRIPTION OF THE DRAWINGS

Embodiments of the invention will now be described solely by way of example and with reference to the accompanying drawings in which:

FIG. 9 shows an embodiment of the present invention configured to provide a substantially rectangular pulse;

FIG. 10 shows a grating impulse response;

FIG. 11 shows an embodiment comprising an optical switch;

DETAILED DESCRIPTION OF PREFERRED EMBODIMENTS OF THE INVENTION

Figure 1:
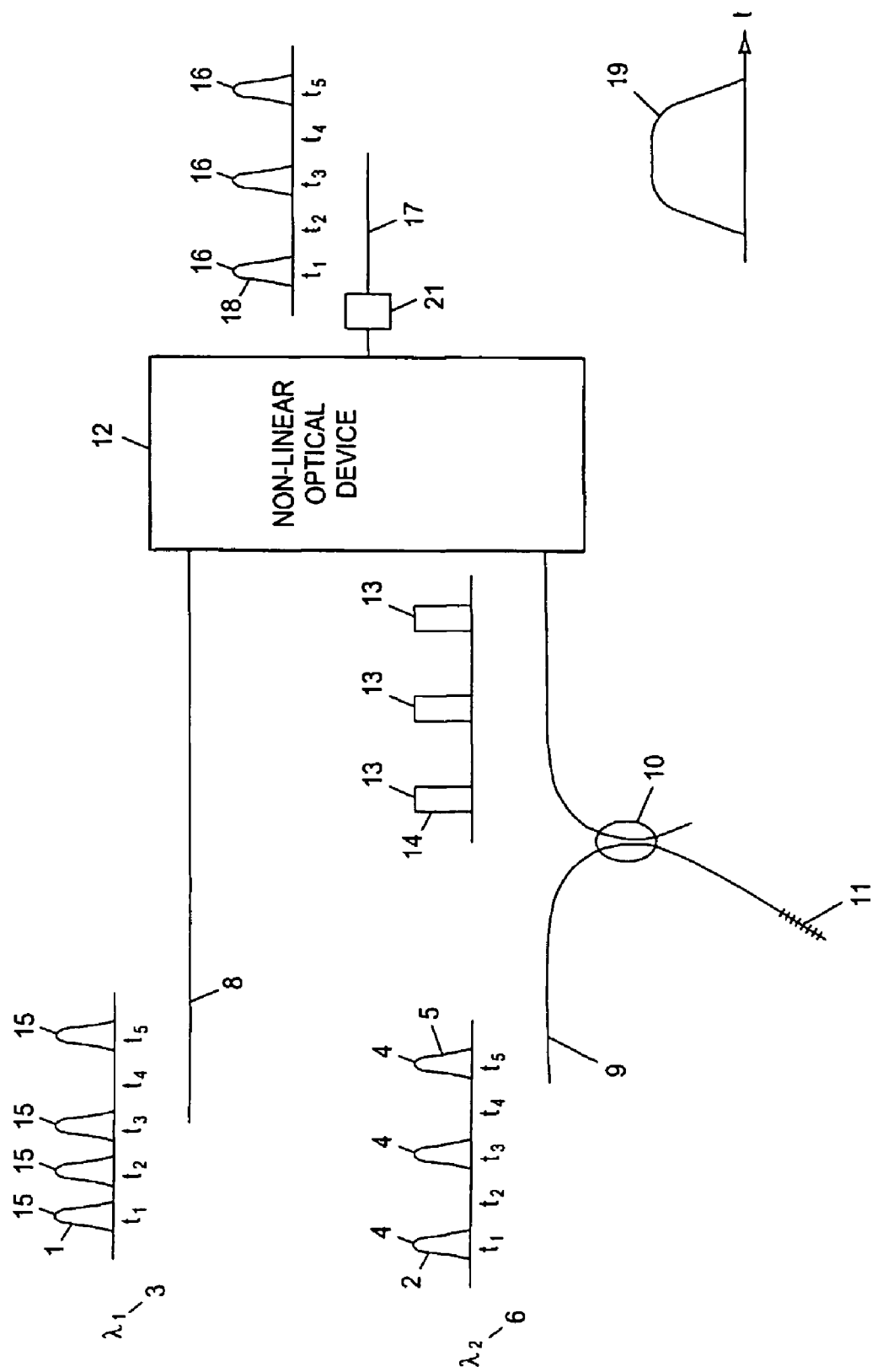
FIG. 1 shows apparatus according to the present invention for providing jitter tolerant optical modulation of a first signal by a second signal.

FIG. 1 shows apparatus for providing timing jitter tolerant optical modulation of a first signal 1 by a second signal 2. The first signal 1 has a first wavelength 3. The second signal 2 comprises a plurality of second signal pulses 4 having a second pulse shape 5 and a second wavelength 6. The apparatus further comprises a first signal input port 8, a second signal input port 9, a coupler 10, a grating 11 and a non-linear optical device 12. The apparatus is configured to direct the second signal 2 at the second signal input port 9 to the non-linear optical device 12 via the coupler 10 and the grating 11, and to direct the first signal 1 at the first signal input port 8 to the non-linear optical device 12. The grating 11 is a superstructured fibre Bragg grating that converts the second signal pulses 4 into intermediary pulses 13 each having an intermediary pulse shape 14. The intermediary pulse shape 14 is such that it provides a switching window 19 within the non-linear optical device 12.

Figure 5:
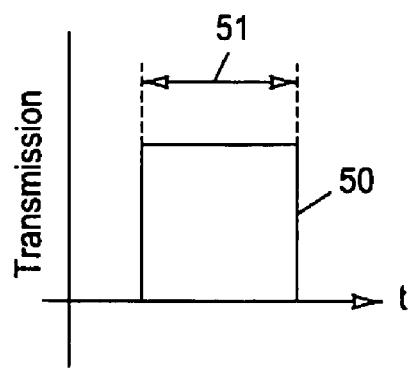
FIG. 5 shows a substantially square switching window.

The switching window 19 may be a substantially rectangular switching window 50 shown with reference to FIG. 5. The switching window 19 may be alternatively be Gaussian, or any other user-defined shape.

The apparatus can be configured such that the apparatus has a single optical input port so that first and second signals 1 and 2 enter the apparatus through the same input port.

The apparatus may further comprise a filter 21 as shown in FIG. 1.

The coupler 10 can be a circulator, an optical fibre coupler or a beam splitter.

The first signal 1 is shown as comprising a plurality of first signal pulses 15. These first signal pulses 15 interact with the intermediary pulses 13 within the non-linear optical device 12, providing an output signal 18 comprising a plurality of output pulses 16 at the output port 17. The first signal 1 is shown as having pulses in time slots t1, t2, t3 and t5; the second signal 2 is shown as having pulses in time slots t1, t3 and t5; and the output signal 18 is shown as having pulses in time slots t1, t3 and t5—ie corresponding to the overlap in time of the first signal pulses 15 and the intermediary pulses 13 within the non-linear optical device 12. The substantially rectangular switching window 50 provided by the intermediary pulse shape 14 helps to reduce distortion of the first signal pulses 15 within the non-linear optical device 12 and provides tolerance to jitter in the arrival times of the first signal pulses 15.

Although FIG. 1 shows the first signal 1 as comprising a plurality of first signal pulses 15, the first signal 1 can alternatively be a continuous wave signal such as an unmodulated laser beam.

The first wavelength 3 can be different from the second wavelength 6. In this case, the non-linear optical device 12 is preferably a semiconductor active element or an optical fibre such as the holey fibre 120, and the filter 21 is preferably a wavelength selective filter such as a fibre Bragg grating or a thin-film filter.

The first wavelength 3 can be the same as the second wavelength 6. In this case, the non-linear optical device 12 is preferably such that its output state of polarization changes in response to the intermediary pulses 13, and the output filter 21 is preferably a polarizer or a polarizing beam splitter.

The first signal 1 can be a data signal and the second signal 2 can be a clock signal. In this case the apparatus provides a demultiplexing function. Alternatively, the first signal 1 can be a clock signal and the second signal 2 can be a data signal whereupon the apparatus provides a multiplexing function.

Figure 2:
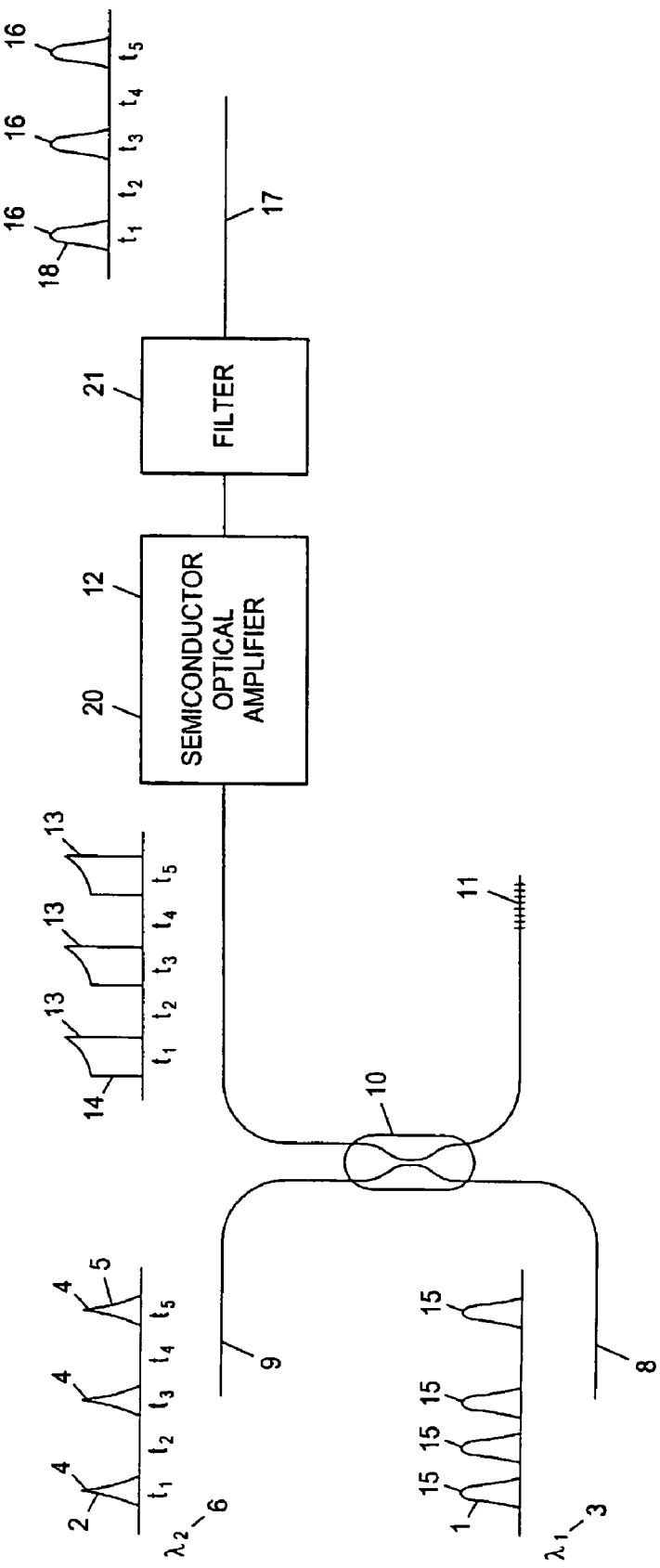
FIG. 2 shows an embodiment of the present invention in which the intermediary pulse shape is defined by the convolution of the second pulse shape and the grating impulse response.
Figure 3:
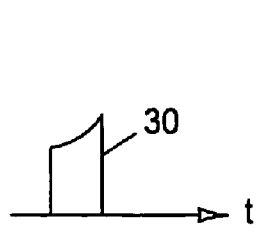
FIG. 3 shows a grating impulse response.
Figure 4:
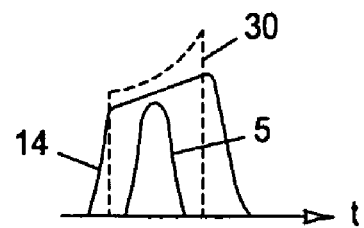
FIG. 4 shows an intermediary pulse shape.

FIG. 2 shows one embodiment of the invention in which the first signal 1 comprises a plurality of first signal pulses 15. The grating 11 is defined by a grating impulse response 30 as shown in FIG. 3. As shown in FIG. 4, the intermediary pulse shape 14 is defined by the convolution of the second pulse shape 5 and the grating impulse response 30. The grating impulse response 30 is selected to provide the rectangular switching window 50 shown in FIG. 5 in the non-linear device 12, which in FIG. 2 is shown as comprising a semiconductor optical amplifier 20.

The apparatus may further comprise the filter 21.

The semiconductor optical amplifier 20 can be part of a terahertz optical assymetric demultiplexer (TOAD), semiconductor laser amplifier in a loop mirror (SLALOM), an ultra-fast non-linear interferometer (UNI), a gain transparent ultra-fast non-linear interferometer (GT-UNI).

The rectangular switching window 50 provides tolerance to a variation in arrival time of the first signal pulse 15 at the first input port 8 and the second signal pulse 4 at the second input port 9 substantially equal to the width 51 of the rectangular switching window. 50 minus the width of the first signal pulse 15.

Figure 6:
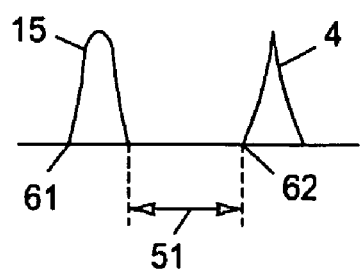
FIG. 6 shows a first signal pulse arriving prior to a second signal pulse.
Figure 7:
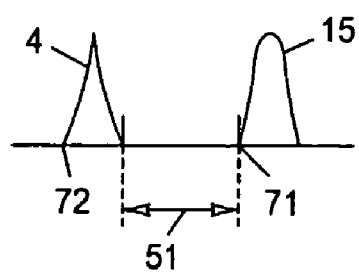
FIG. 7 shows a first signal pulse arriving after a second signal pulse.

FIG. 6 shows an example in which the first signal pulse 15 arrives at a time 61, the second signal pulse 4 arrives at a time 62, and in which the rectangular switching window is the width 51. FIG. 7 shows another example in which the first signal pulse 15 arrives at a time 71, the second signal pulse 4 arrives at a time 72, and in which the rectangular pulse switching window is the width 51. FIGS. 6 and 7 illustrate the maximum possible variation in the arrival times 61 and 62 such that the non-linear optical device 12 does not distort the first signal pulse 15 by virtue of timing jitter.

Figure 21:
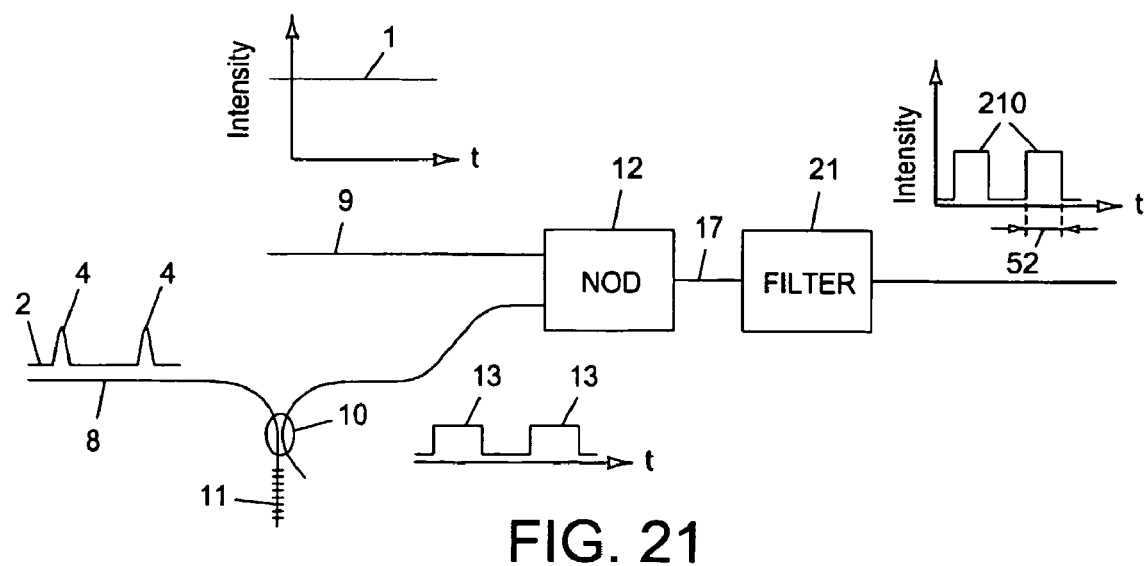
FIG. 21 shows apparatus according to the present invention utilizing continuous wave switching.
Figure 48:
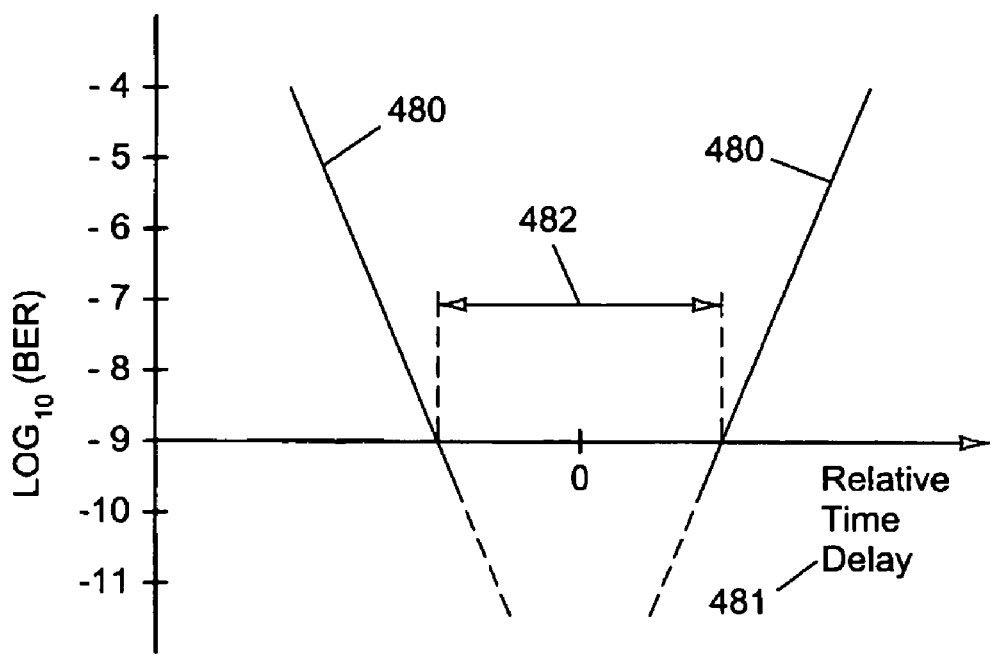
FIG. 48 shows a definition of a switching window.

The term switching window can be defined in a number of ways. A first definition shown in FIG. 21 is that the 'continuous wave switching window' 210 is defined by the pulse shape 210 when driven by the intermediary pulse 13 in response to the second signal pulses 4, and in which the first signal 1 at wavelength 3 is a continuous wave beam. When using the apparatus with a first signal 1 comprising first signal pulses 15, the switching window is given by the width of the 'continuous wave switching window' 210 minus the width of the first signal pulse 15. A second definition can be couched more directly in terms of the system performance itself as illustrated in FIG. 48 which shows a plot of Bit Error Rate (BER) 480 versus relative time delay 481 of the pulses associated with the first and second signal pulses 15, 4. Bit error rate measurements provide a measure of the quality of the pulse switching provided by the apparatus, the higher the bit error rate the worse the switch performance. An error rate of 1 in $10^{-9}$ is often referred to as error-free and taken to represent the lower bound on acceptable performance of telecommunication apparatus. Thus an alternative system description of timing window for the switch is the total length of relative timing delay 482 over which error free performance can be achieved. The BER increases rapidly at the rising and trailing edges of the timing window. In practice the two definitions of timing values give roughly equivalent values under the two definitions, particularly for rectangular switching windows and we use both definitions herein. More specifically we tend to use the first definition when the intermediary pulse form is itself substantially rectangular in shape, and the later definition for the more general case.

The embodiment shown in FIG. 2 is representative of switching approaches in which the required intermediary pulse form required to provide a substantially rectangular switching window is not a rectangular pulse, but some other pulse form that compensates for non-instantaneous non-linear responses (such as cross gain modulation) and dispersive effects within the non-linear optical device 20.

Figure 8:
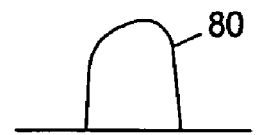
FIG. 8 shows the impulse response of an optical switch.

In order to establish the intermediary pulse shape 14 it is necessary first to characterise the impulse response 80 shown in FIG. 8 of the non-linear optical device 12 as a function of incident pulse energy/power, and then to use this information to establish the required form of intermediary pulse shape 14 needed to define a substantially rectangular switching window 50. The impulse response 30 of the grating 11 required to convert the second signal pulses 4 can then be evaluated, and the required supestructured grating design itself derived using a suitable inverse grating design algorithm such as R. Feced, M. N. Zervas, and M. A. Muriel, "An efficient inverse scattering algorithm for the design of non-uniform fibre Bragg gratings", IEEE J. Quantum Electron., vol. 35, pp. 1105–1111, 1999.

In order to determine the impulse response 80 of the non-linear optical device 12 (as a function of incident pulse power) it may be necessary to use an experimental pulse characterisation technique capable of providing both phase and amplitude information. Appropriate techniques are described in B. C. Thomsen, P. Petropoulos, H. L. Offerhaus, D. J. Richardson, and J. D. Harvey, "Characterization of a 10 GHz harmonically mode-locked erbium fibre ring laser using second harmonic generation frequency resolved optical gating", Technical Digest CLEO '99, Baltimore, 23–28 May 1999, paper CTuJ5. Further means to provide such characterisation are found described in "Measuring ultrashort laser pulses in the time domain using frequency resolved optical gating" by R. Trebino, K W DeLong, D N Fittinghoff, J N Sweetser, M A Krumbugel, B A Richman, D J Kane in Review of Scientific Instruments, Vol. 68, 3277–3295, (1997).

Also shown in FIG. 2 is a filter 21 that may be necessary for filtering the output of the non-linear optical device 12. The filter 21 may be a polarising element such as a polarizer or a polarization beam splitter, a wavelength selective filter such as an optical fibre Bragg grating or thin film filter. When used in conjunction with a semiconductor optical amplifier as shown in FIG. 2, the filter 21 is preferably a wavelength selective filter.

FIG. 9 shows another embodiment of the invention in which the first signal 1 comprises a plurality of first signal pulses 15. The grating 11 is defined by a grating impulse response 100. As shown in FIG. 10, the intermediary pulse shape 14 is defined by the convolution of the second pulse shape 5 and the grating impulse response 100. The grating 11 being such that the intermediary pulse shape 14 is a substantially rectangular pulse 95, and in which the apparatus has a tolerance to a variation in arrival time of the first pulse 15 at the first input port 8 and the second pulse 4 at the second input port 9 substantially equal to the width 101 of the substantially rectangular pulse 95 minus the width of the first signal pulse 15. The non-linear optical device 12 shown in FIG. 9 is a non-linear loop mirror (NOLM) 90 comprising dispersion shifted optical fibre (DSF) 91 and two couplers 92. The couplers are preferably 3 dB optical fibre couplers. The DSF 91 is configured to have normal dispersion at the first wavelength 3 and may have a length in the region 1 m to 10,000 m depending on the amount of non-linearity present. The NOLM 90 may further comprise a polarization controller 93. The first wavelength 3 is different from the second wavelength 6. The first wavelength 3 is usually at a shorter wavelength than the second signal wavelength 6 for fibre based devices since: (a) it is often important to minimise group velocity induced walk-off between the first and intermediary signal pulses 15, 13 as they propagate through the nonlinear fibre and this is most readily achieved by arranging the two signal wavelengths to lie roughly symmetrically about the zero dispersion wavelength of the fibre, and (b) the switched, or modulated signal 1 needs to lie in the normal dispersion regime in order to avoid the impact of induced intensity noise due to soliton effects. The filter 21 is preferably a wavelength selective filter, which may be a fibre Bragg grating or a thin-film filter.

The tolerance to difference in arrival times, and thereby jitter, of the first and second optical signals 1 and 2 is determined by the widths 50 and 101 of the substantially rectangular switching window 50 or the substantially rectangular pulse 95 respectively. It is envisaged that using suitably fabricated gratings 11 this tolerance could be as large as 200 ps. This tolerance is suitable for high jitter tolerance optical processing at data rates as low as 5 Gbit/s. At the other extreme we envisage that the technology should also allow the generation of intermediary pulses 13 with widths as short as 100 fs, making it suitable for optical processing at data rates between 1 Tbit/s to at least 10 Tbit/s. The technology should also allow processing at intermediate date rates.

FIG. 11 shows an embodiment in which the apparatus comprises an optical switch 111, the optical switch 111 being such that it comprises the non-linear optical device 12. The optical switch 111 can be used in each of the embodiments shown in FIGS. 1, 2 and 9. The non-linear optical device 12 may comprise a lithium niobate channel waveguide, or a lithium niobate planar waveguide. The non-linear optical device 12 may comprise a periodically poled lithium niobate channel waveguide or a periodically poled lithium niobate planar waveguide. The non-linear optical device may comprise a holey fibre, a poled-fibre, a potassium titanyl phosphate (KTP) or other crystalline waveguide, a periodically poled KTP or other crystalline waveguide, a non-linear optical loop mirror, a Kerr gate, an optical fibre, a non-linear amplifying loop mirror, or a non-linear optical modulator.

Figure 12:
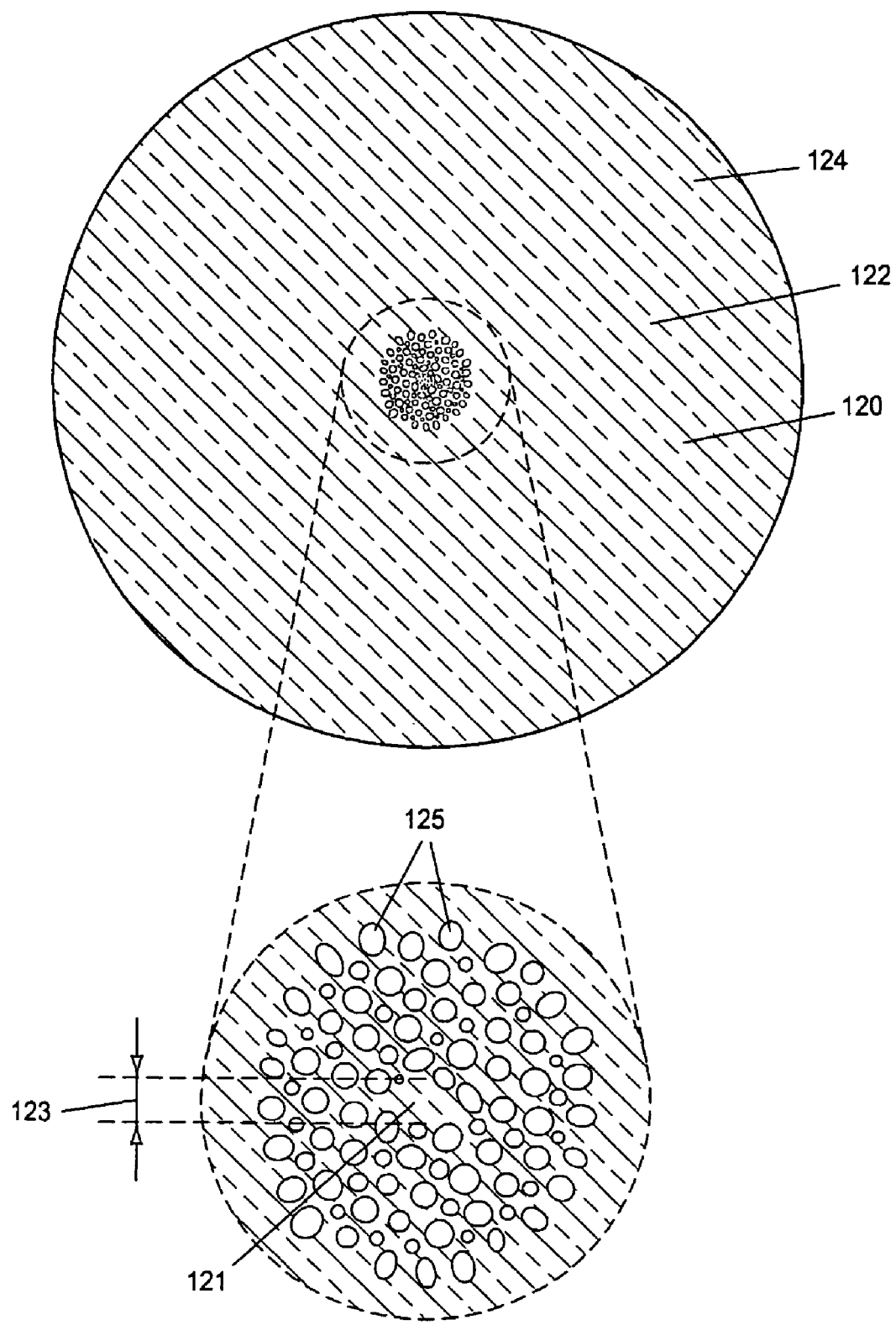
FIG. 12 shows the end face of a holey fibre.

FIG. 12 shows the cross-section of a holey fibre 120 which can be configured as the non-linear optical device 12 in the embodiments of FIGS. 1, 2 and 9. The holey fibre 120 comprises a core 121 and a cladding 122, in which the cladding 122 comprises a plurality of holes 123 arranged around the core 122. The holey fibre 120 has a core diameter 123 of 2 $\mu$m. The core 121 and the cladding 122 are shown enlarged in the inset. The core 122 can have a diameter 123 between 2 $\mu$m and 10 $\mu$m. Preferably the core 122 has a diameter 123 less than 2 $\mu$m. By holey fibre, we mean a fibre comprising longitudinally-extending holes that may be twisted along the length of the fibre and we include similar or alternatively-named fibres such as microstructured fibres and photonic band-gap fibres.

The holey fibre 120 is made from a single transparent material 124 (discounting air as a constituent material). The transparent material 124 is silica. Holey fibres can also be made from other forms of silicate glass (e.g Lead glasses such as Schott glasses SF57, SF58, SF59, or Bismuth oxide based glasses), or indeed any other form of glass including any compound glass (eg multi-component glasses such as chalcogenide glasses). Preferably, the glass would have a large third order (Kerr) non-linear coefficient ($>2.10^{-20}$ $m^2/W$), and low loss at the operating wavelength of the non-linear optical device (<10 dB/m). The material may also be a polymer, such as polymethyl methacrylate (PMMA) although any polymer with a significant second order (>0.01 pm/V), or third order non-linear coefficient ($>2.10^{-20}$ $m^2/W$) could be envisaged. The holey fibre 120 may also comprise a dopant in either the core 121 or the cladding 122, or both. The dopant may comprise Ytterbium, Erbium, Neodymium, Praseodymium, Thulium, Samarium, Holmium Dysprosium, Tin, Germanium, Phosphorous, Aluminium, Boron, Antimony, Uranium, Gold, Silver, Bismuth, Lead, a transition metal, and a semiconductor.

Figure 13:
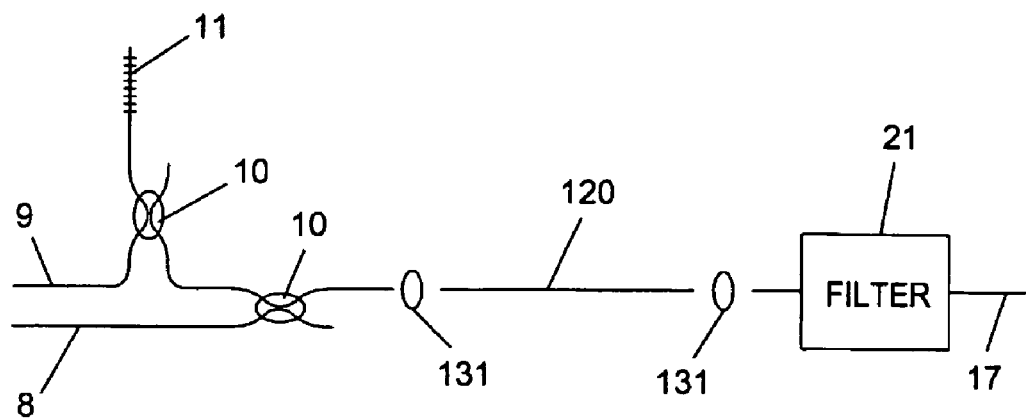
FIG. 13 shows apparatus according to the present invention and comprising a holey fibre.

FIG. 13 shows an apparatus comprising the holey fibre 120 and coupling means 131 for coupling optical energy into and out of the holey fibre 120. The length of the holey fibre 120 can be between 0.1 m and 10 km. The dispersion can be normal or anamalous at the first signal wavelength 3. In certain instances it is preferable for the dispersion to be normal at the first signal wavelength 3 and anomalous at the second signal wavelength 6 to minimise pulse walk-off. Normal dispersion for the first signal wavelength is advantageous in order to avoid soliton induced noise effects. In other instances it may be desirable to have both the first and second signal wavelengths 3, 6 in the normal dispersion regime in order to avoid soliton-induced intensity noise effects.

Figure 14:
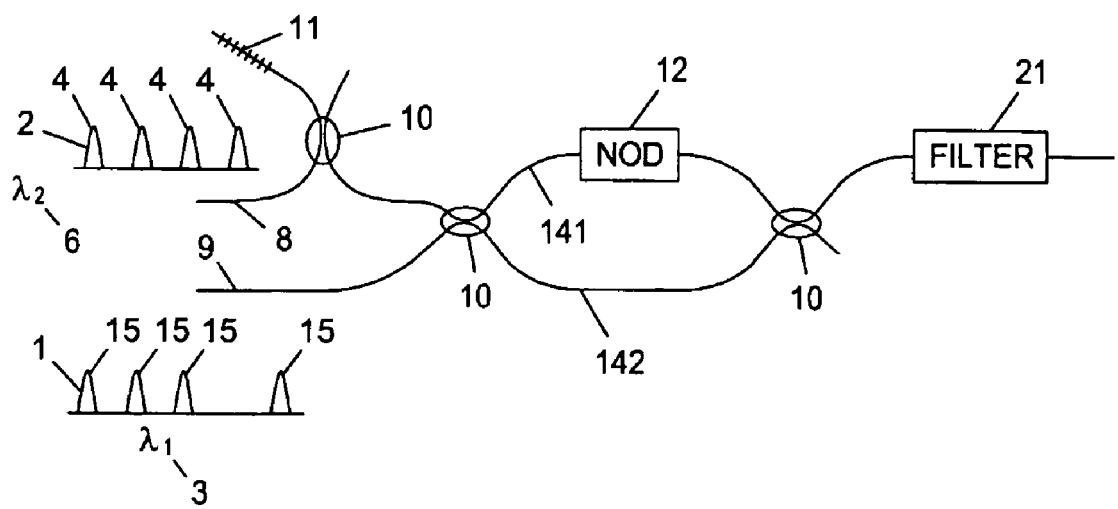
FIG. 14 shows apparatus according to the present invention and comprising an interferometer.

FIG. 14 shows an apparatus comprising an interferometer 140 comprising a first arm 141 and a second arm 142. The first arm 141 comprises the non-linear optical device 12. The interferometer 140 is a Mach Zehnder interferometer. The apparatus can also be constructed using a Michelson Interferometer, a Sagnac interferometer or another configuration of optical interferometer.

Figure 15:
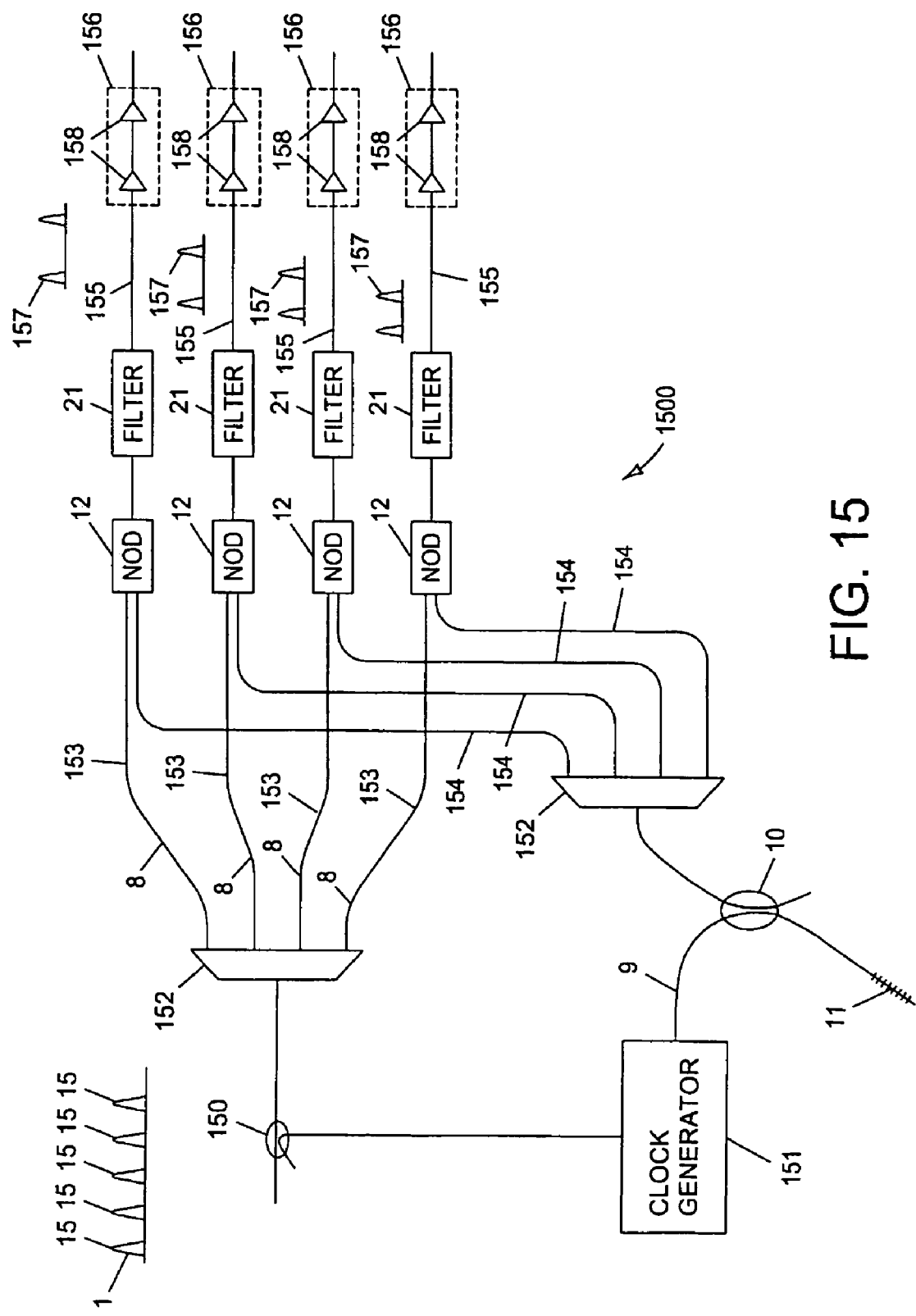
FIG. 15 shows apparatus according to the present invention configured as an optical demultiplexer.

FIG. 15 shows an apparatus configured as an optical demultiplexer 1500. The apparatus de-multiplexes the first signal 1 into a plurality of lower data rate signals 157. The apparatus comprises a clock generator 151, couplers 152, a plurality of the non-linear optical devices (NOD) 12 and the filters 21 interconnected by first optical fibres 153 and second optical fibres 154. The first and second optical fibres 153, 154 have lengths configured such that the non-linear optical devices 12 demultiplex the first optical signal 1 into different ones of the lower data rate signals 157. It is preferable that the clock generator 151 is synchronized to the first optical signal 1 utilizing a tap 150 which may be an optical coupler. In the example shown, the clock generator 151 will output a second optical signal 2 having a frequency four times less than the frequency of the first optical signal 1. The filters 21 have filter output ports 155 that are shown connected to optical communication lines 156 that may comprise at least one optical amplifier 158.

The clock generator 151 may comprise a short-pulse generator. The short pulse generator can be a mode-locked fibre laser, an actively mode-locked fibre laser, a generator comprising an electro-absorption modulator and a laser, a generator comprising an electro-optic modulator and a laser, a gain-switched laser diode. The short-pulse generator may also comprise a means for pulse compression such as dispersion compensator fibre, a chirped fibre Bragg grating, a dispersion decreasing fibre, an optical amplifier, a Raman amplifier, an optical switch, an optical pulse compressor, or some combination of these devices.

Figure 16:
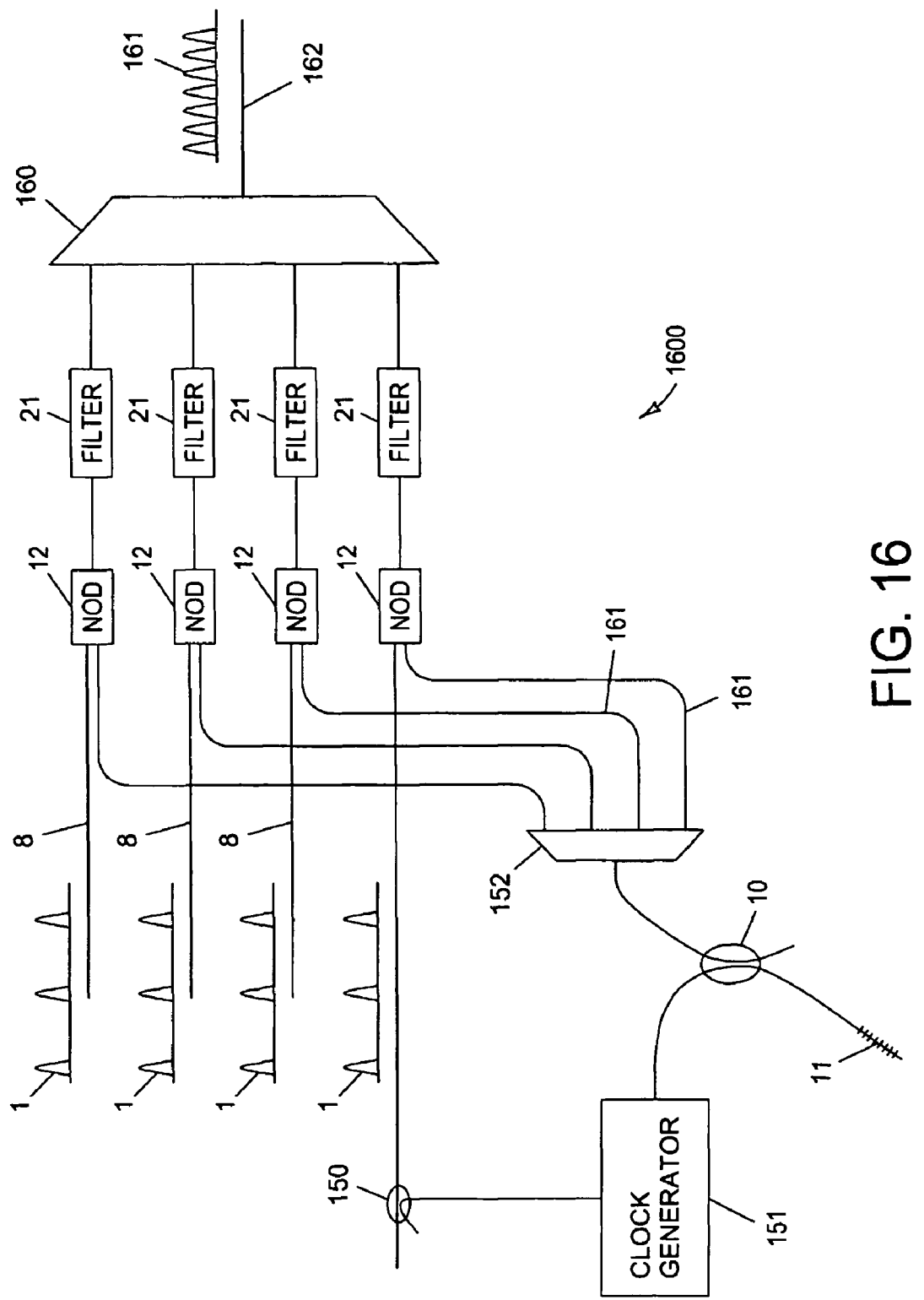
FIG. 16 shows apparatus according to the present invention and configured as an optical multiplexer.

FIG. 16 shows an apparatus configured as an optical multiplexer 1600. The apparatus multiplexes a plurality of first optical signals 1 into a higher data rate signal 161. The apparatus comprises a multiplexer 160, an output port 162, and a plurality of optical fibres 161. The optical fibres 161 have lengths configured such that the non-linear optical devices 12 multiplex the first optical signals 1 into the higher data rate signal 161 without cross-talk. It is preferable that the clock generator 151 is synchronized to at least one of the first optical signals 1 utilizing a tap 150 which may be an optical coupler. In the example shown, the clock generator 151 will output a second optical signal 2 having a frequency four times greater than the frequency of the first optical signal 1. The apparatus may further comprise a wavelength converter for converting the wavelength of one or more of the first optical signals 1.

Figure 17:
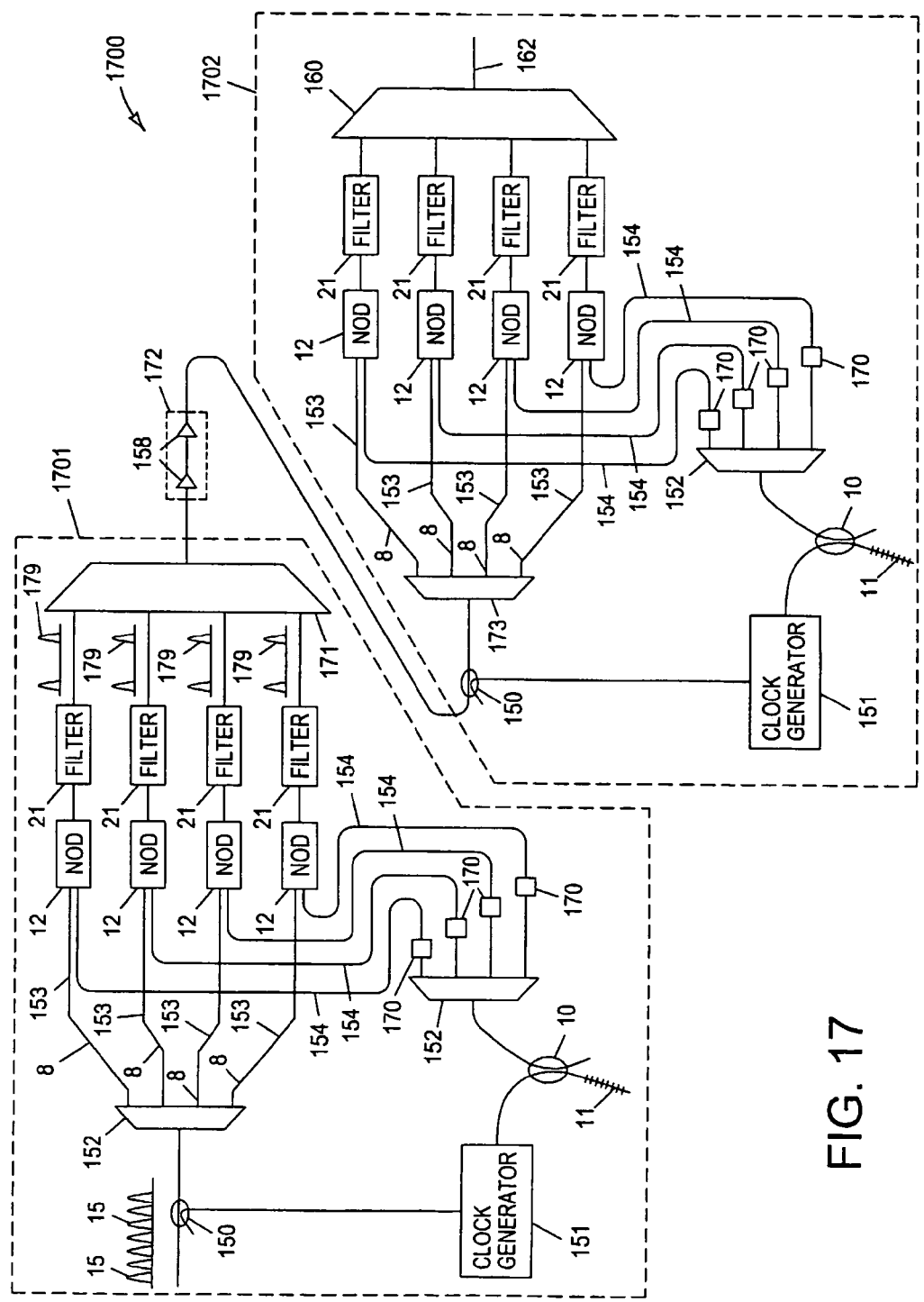
FIG. 17 shows apparatus according to the present invention and configured as an inverse multiplexer.

FIG. 17 shows an apparatus configured as an inverse multiplexer 1700. The inverse multiplexer demultiplexes a first optical signal 1 into a plurality of lower data rate signals 179 having different wavelengths for transmission through a wavelength division multiplexed (WDM) optical transmission line 172. This application has advantages for demultiplexing a 40 Gb/s signal into four 10 Gb/s signals operating on four wavelength channels in a WDM system. The optical transmission line 172 may be between 100 m and a thousand kilometres in length, and may comprise at least one optical amplifier 158. The demultiplexing stage 1701 is similar to the apparatus shown in FIG. 15 except that the lower data rate signals 179 have different wavelengths. The apparatus therefore contains wavelength converters 170 configured such that the lower data rate signals 179 have different wavelengths from each other. The wavelength converters are shown connected to the second optical fibres 154. They can also be connected to the first optical fibres 153 or the filters 21. Alternatively, they be an integral part of the non-linear optical devices 12. The wavelength converters 170 may comprise a semiconductor amplifier, a NOLM, a dispersion shifted fibre, an optical fibre, a holey fibre, or a lithium niobate device.

The lower data rate signals 179 are multiplexed with a multiplexer 171 into a wavelength division multiplexed signal 178 which is transmitted through a wavelength division multiplexed optical transmission line 172.

The multiplexing stage 1702 following the optical transmission line 172 is similar to the apparatus of FIG. 16 except that it comprises a wavelength division demultiplexer 173 that demultiplexes the lower data rate signals 179. The multiplexing stage 1702 may be exchanged with an electronic multiplexer.

The inverse multiplexer 1700 may require dispersion compensators to balance the overall group delays between the different wavelength channels propagating through the optical transmission line 172. Differential delays may also be required between the different wavelength channels in order to reconstitute the first signal 1 properly at the output 162. The differential delays may be introduced by taking great care in the optical path lengths in the demultiplexing stage 1701 and the multiplexing stage 1702. Differential delays may also be added electronically at the receiver utilizing some form of pattern recognition on the received data.

Figure 18:
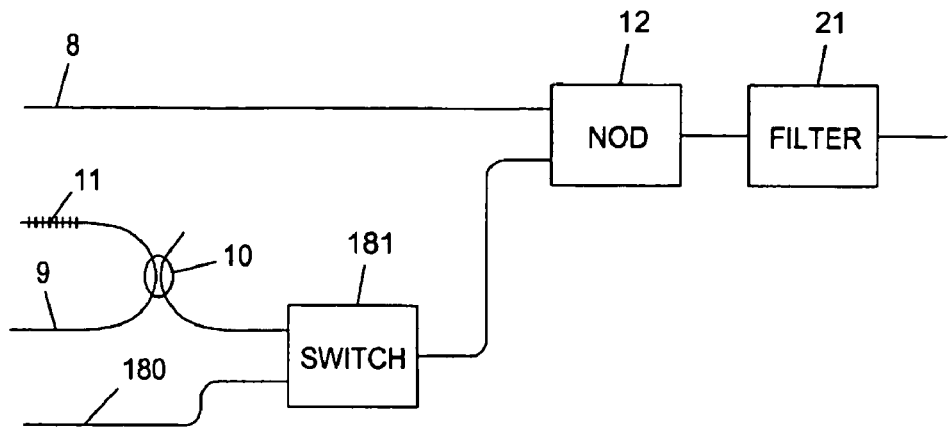
FIG. 18 shows apparatus according to the present invention and further comprising a switch.

FIG. 18 shows an apparatus comprising a control line 180 and a switch 181. The control line 180 may be an optical control line 180 and the switch 181 may be an optical switch. The switch 181 can also be located on the first optical input 8 or connected to the filter 21. The apparatus is useful for turning the non-linear optical device 12 on and off and can be used to provide intelligent routing of optical signals through optical telecommunication networks. The apparatus shown in FIG. 18 can be incorporated in any of the embodiments of the invention described above, for example in order to add intelligence into an optical network.

Figure 19:
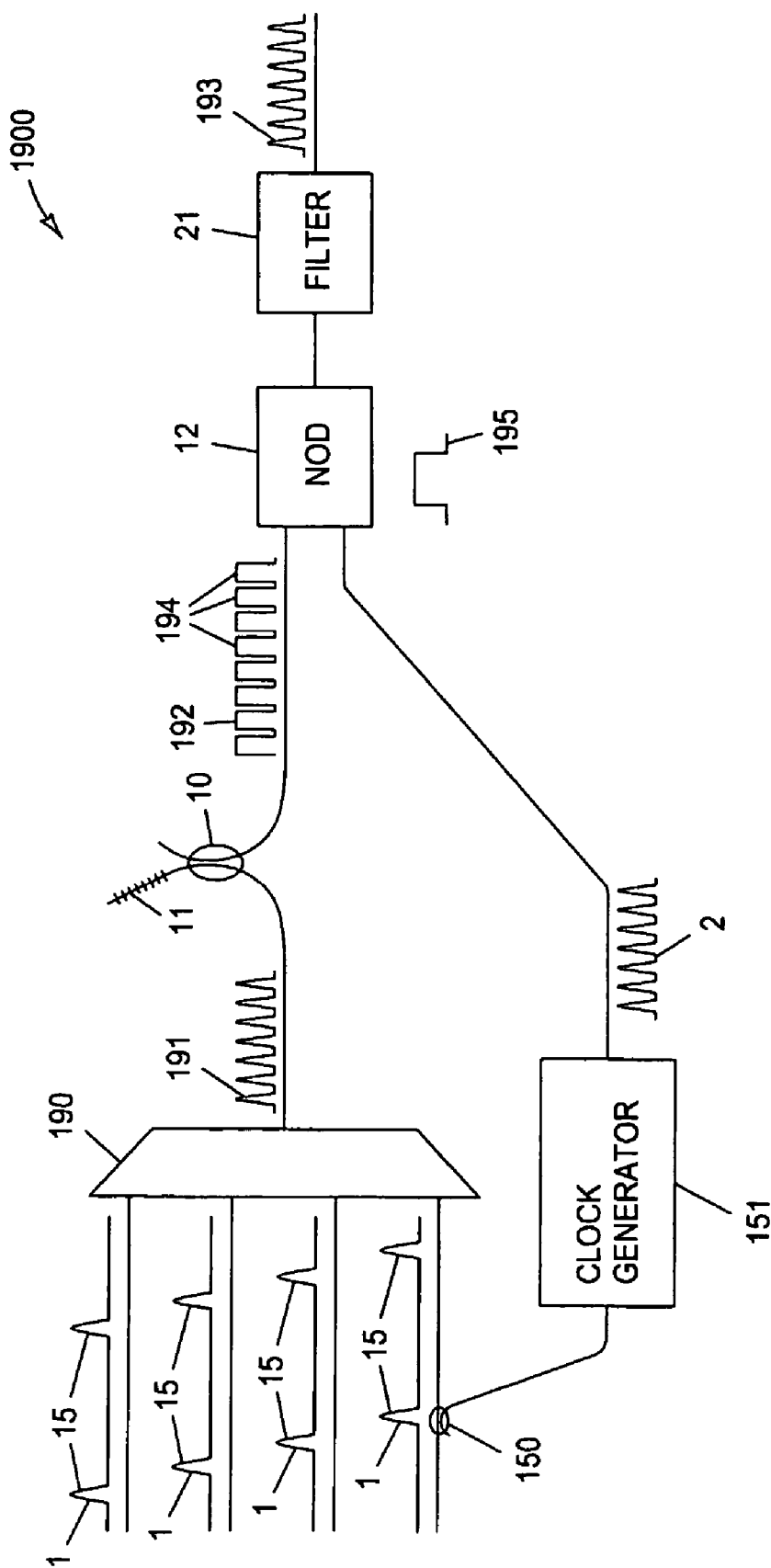
FIG. 19 shows a multiplexer according to the present invention with regenerative properties.

FIG. 19 shows an apparatus configured as an optical multiplexer 1900 with signal regeneration capability. The apparatus multiplexes a plurality of first optical signals 1 into a higher data rate signal 193 and can serve to reduce both timing and amplitude jitter on the first optical signals 1. The apparatus comprises a multiplexer 190 which serves to interleave the incoming first optical signals 1 into a higher data rate signal 191 without introducing substantial cross talk. To do this reliably means that the individual first optical signals 1 need to be mutually synchronised and in certain instances some form of dynamic control may be required to ensure this. The multiplexer 190 might be an array of optical fibre couplers, or a planar lightwave circuit with appropriate delays for the different optical paths through the system. It is preferable that the clock generator 151 is synchronized to at least one of the first optical signals 1 utilizing a tap 150 which may be an optical coupler. In the example shown, the clock generator 151 will output a second optical signal 2 having a frequency four times greater than the frequency of the first optical signal 1. The optical signal 191 is then converted to a high frequency optical data signal 192 in which the individual pulses have the intermediary pulse shape 194 required to obtain a square switching response from the non-linear optical device 12. The optical signal 192 is then input to the non-linear optical device 12. The square temporal switching window 195 of the non-linear device 12, and the non-linear intensity dependent transmission response 490 of the non-linear optical device (see FIG. 49), then serve to reduce any timing, or amplitude noise associated with incoming relatively-lower data rate signals 1, providing a less-noisy interleaved signal 193.

Figure 20:
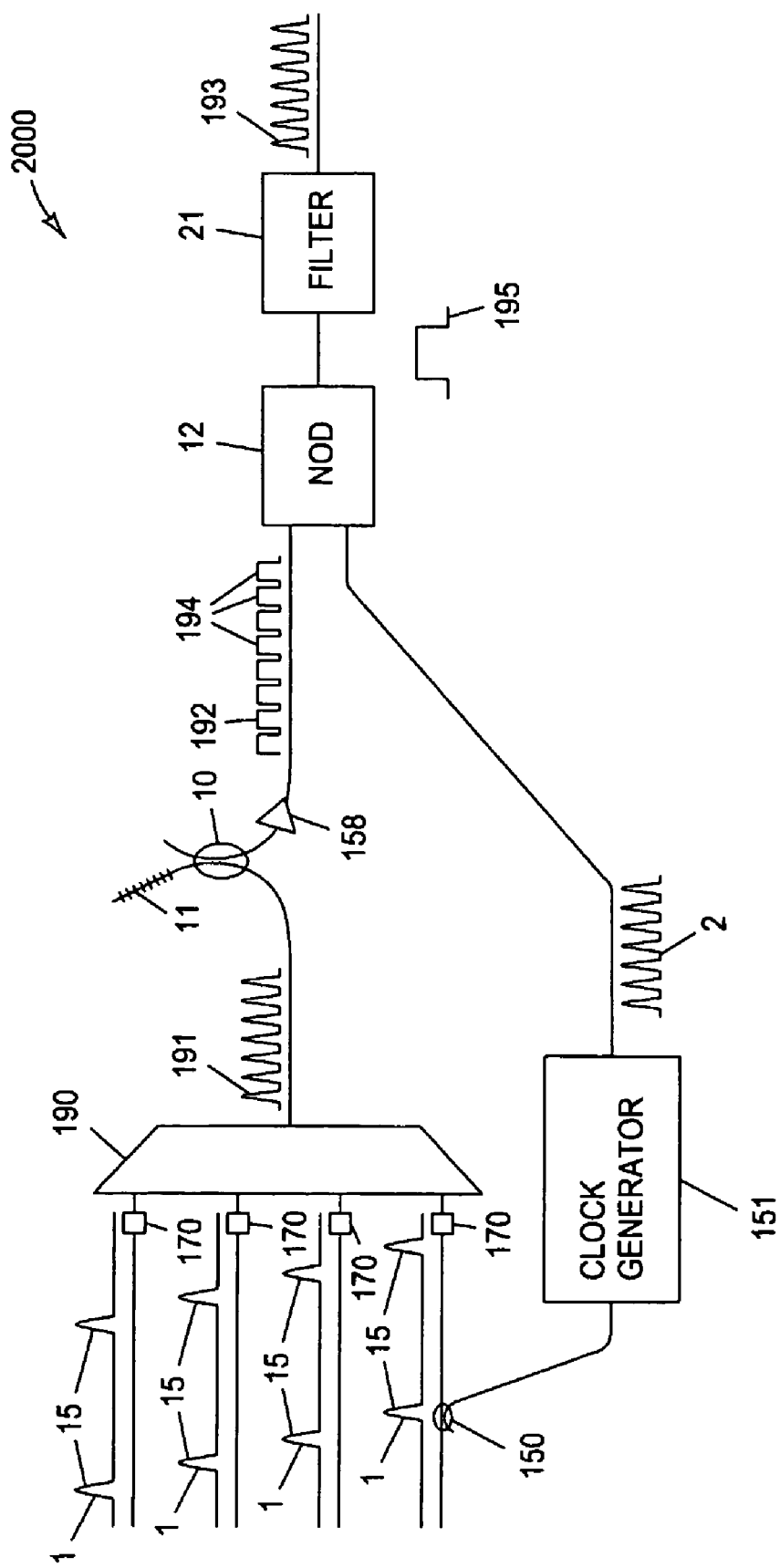
FIG. 20 shows a DWDM multiplexer according to the present invention.

FIG. 20 shows an apparatus configured as an optical signal multiplexer 2000 with signal regeneration capabilities. The apparatus multiplexes a plurality of first optical signals 1 each with a different wavelength (e.g. separate WDM channels) into a higher data rate signal 193 and can serve to reduce both timing and amplitude jitter on the first optical signals 1. Wavelength converters 170 are used to wavelength convert each of the incoming signals to have the same wavelength at the input to the multiplexer 190, which serves to interleave the incoming first optical signals into a higher data rate signal 191 without introducing substantial cross talk. To do this reliably means that the individual first optical signals need to be mutually synchronised and in certain instances some form of dynamic control may be required to ensure this. The multiplexer 190 might be an array of optical fibre couplers, or a planar lightwave circuit with appropriate delay for the different optical paths through the system. It is preferable that the clock generator 151 is synchronized to at least one of the first optical signals 1 utilizing a tap 150 which may be an optical coupler. In the example shown, the clock generator 151 will output a second optical signal 2 having a frequency four times greater than the frequency of the first optical signal 1. The optical signal 191 is then converted to a high frequency optical data signal 192 in which the individual pulses have the intermediary pulse shape 179 required to obtain a square switching response from the switch. This optical signal is then input to the nonlinear optical device 12. The square temporal switching window 195 of the nonlinear device 12, and the periodic nonlinear intensity dependent response 490 of the switch (see FIG. 49), then serve to reduce any timing, or amplitude jitter associated with incoming relatively-lower data rate signals 1, providing a less-noisy interleaved signal 193.

The following examples describe the use of superstructured fibre Bragg gratings (SSFBGs) to convert the output of an actively mode-locked, 2.5 ps fibre laser, a reliable source of short pulses of a well-defined soliton shape, to 20 ps rectangular pulses. These pulses are then used to control the operation of two sorts of non-linear switch. High quality, ~15–20 ps rectangular switching windows are obtained, providing +/−7 ps, 15 ps timing jitter tolerance, in switches based on both the Kerr effect in dispersion shifted fibre (DSF), and on four-wave mixing in a semiconductor amplifier (SOA).

SuperStructured Fibre Bragg Gratings (SSFBGs) can be considered and employed as spectral filters of controllable phase and amplitude. The term SSFBG refers to a fibre Bragg grating (FBG) whose refractive index profile is not uniform in amplitude and/or phase along its length. For ease of discussion, we restrict the following discussion to the weak grating limit in which the relative changes of its refractive index are small enough to allow the incident light to penetrate the full device length, such that the whole grating contributes equally to the reflected signal. However, it should be appreciated that due to recent advances in grating design algorithms the general principles outlined below can now be readily applied to the high reflectivity, non-Fourier design limit—see for example R. Feced, M. N. Zervas, and M. A. Muriel, "An efficient inverse scattering algorithm for the design of nonuniform fibre Bragg gratings", IEEE J. Quantum Electron., vol. 35, pp. 1105–1111, 1999. For a weak SSFBG the wavevector response F(κ) is given by the Fourier transform of the spatial refractive index modulation profile A(x) used to write the grating, where κ is the wavevector, which is proportional to the frequency ω, i.e.

$$F(\kappa) = \frac{1}{2\pi}\int_{-\infty}^{+\infty} A(x)e^{j\kappa x}dx. \quad \text{(Eq. 1)}$$

The impulse response h(t) of a fibre grating is given by the inverse Fourier transform of its frequency response H(ω)

$$h(t) = \int_{-\infty}^{+\infty} H(\omega)e^{-j\omega t}d\omega. \quad \text{(Eq. 2)}$$

This equation is true for any fibre grating—ie for both weak and strong SSFBG's.

It follows that the impulse response h(t) of a weak FBG is a pulse of the same temporal profile as the spatial modulation profile A(x) of the grating (with an appropriate conversion from the space to time frame via t=2x·n/c, where n is the refractive index of the fibre core). The (reflected) optical response y(t) of the grating to a pulse of finite time duration x(t) is given by the convolution of the input signal with the grating's impulse response i.e.

$$y(t)=x(t)*h(t). \tag{Eq. 3}$$

Alternatively, as expressed in the frequency domain, the reflected signal Y(ω) is the product of the incident signal X(ω) with H(ω)

$$Y(\omega)=X(\omega)H(\omega) \tag{Eq. 4}$$

where Y(ω) and X(ω) imply the Fourier transforms of y(t) and x(t) respectively. Thus it can be appreciated that, for well-specified input and target output pulse forms, one can (subject to the usual laws of causality and the limits of fibre Bragg grating FBG technology) design and fabricate an FBG to perform the required shaping operation. SSFBGs are attractive for many pulse shaping applications since they offer all the advantages associated with fibre components, such as ready integration into fibre systems and low coupling losses. Moreover, they are potentially low-cost devices.

Advances in the fabrication of FBGs now allow the fabrication of gratings with truly complicated amplitude and phase characteristics, greatly extending the potential and range of applications of the approach.

The following experiments demonstrate the fabrication and use of a truly complex superstructure grating designed to transform short optical pulses (2.5 ps at 10 GHz) into a corresponding train of 20 ps rectangular pulses. The results achieved highlight the quality of the "continuous grating writing" technique and establish the superstructure technique as a viable means for achieving a broader range of pulse shaping functions than had generally been considered technologically feasible.

Figure 22:
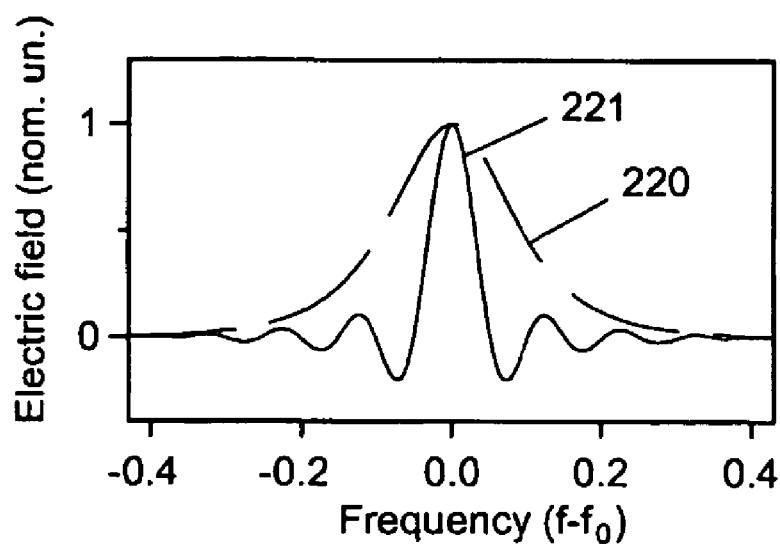
FIGS. 22 to 30 show the results of calculation on pulse shaping filters according to the present invention.
Figure 23:
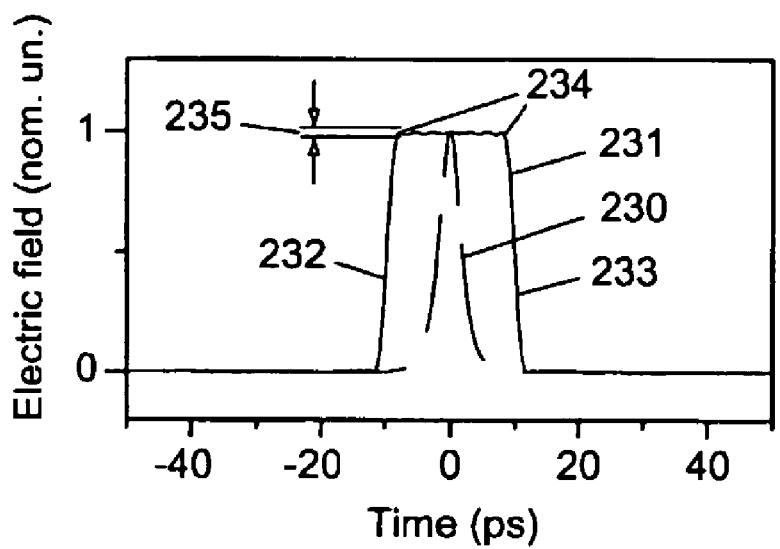

With reference to FIGS. 22 and 23, since the pulse shaping provided by the grating 11 is a purely passive-filtering process it is necessary to provide a well-defined input pulse form 230 to filter and thereby reliably re-shape. In the following discussion, "input pulses" refers to the second signal pulses 4, and "output pulses, target pulses and output waveforms" refers to the intermediary pulses 13. Input pulses were generated using an actively mode-locked erbium doped fibre ring laser containing anomalously dispersive fibre, which naturally generates high-quality optical solitons by virtue of its principle of operation. The target output waveform 231 was a rectangular pulse with 20 ps duration. This particular pulse duration was chosen to ensure an adequate number of spectral features could be accommodated within the finite available spectral bandwidth defined by the input pulse form 230 and the SSFBG reflectivity bandwidth. (The input pulse duration was 2.5 ps (full width at half maximum—FWHM) and the SSFBG bandwidth was restricted to 6 nm, which represents the −40 dB spectral bandwidth for such pulses).

FIG. 22 shows the input pulse spectrum 220 and the output pulse spectrum 221 associated with the choice of input and output pulse forms 230, 231. The spectrum of an idealized rectangular pulse is a sinc function, which exhibits lobed features of alternating optical phase. For the particular choice of relative pulse durations, 13 spectral lobes can be accomodated within the available 6 nm spectral bandwidth. By retaining a significant number of features (and associated broadband spectral components) fast rise times 232 and fall times 233 can be obtained on the output pulse 231. The spectral truncation gives rise to the development of a 'ringing structure' 234 close to the rectangular pulse edges in the time domain (Gibbs phenomenon). The design of the grating 11 seeks to minimize these effects by apodizing the output spectrum 221 using a Gaussian profile, so that the targeted signal spectrum 221 follows the mathematical specification:

$$Y(\omega) = \frac{\sin(p\omega)}{p\omega} \cdot e^{-(a\omega)^2}. \tag{Eq. 5}$$

The factor p in this equation determines the spectral width, and in this case was set to 9.87 THz$^{-1}$. The expense of introducing apodization is a slight increase in the rise and fall times of the pulses 232, 233. The apodization factor a was kept fairly small, namely 0.55 THz$^{-1}$, to give a satisfactory trade-off between the two undesirable effects. The 10–90% rise/fall times of the target pulses 231 were 1.6 ps and the relative ripple depth 235 as shown in FIG. 23 was 0.03. The corresponding figures for non-apodized pulses are rise/fall times of 1.0 ps and a relative ripple depth of 0.24. Note here that we define the relative ripple depth as the ratio of the difference between the highest and lowest intensity points of the ripple at the top of the rectangular pulses 231 to the maximum intensity of the pulses.

Figure 24:
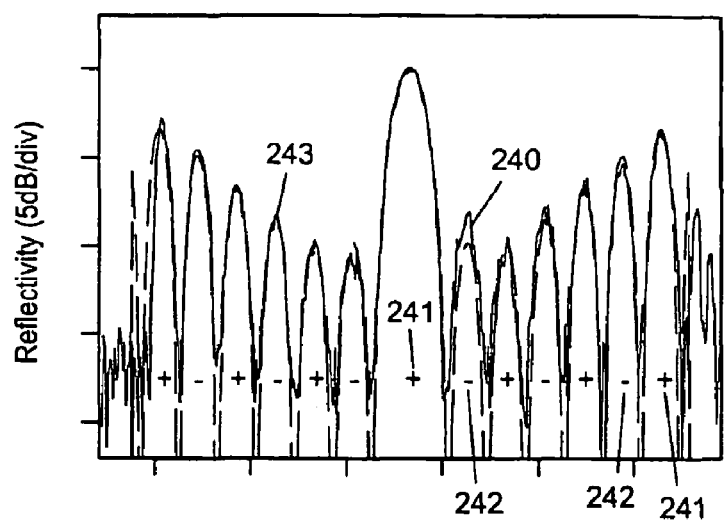
Figure 25:
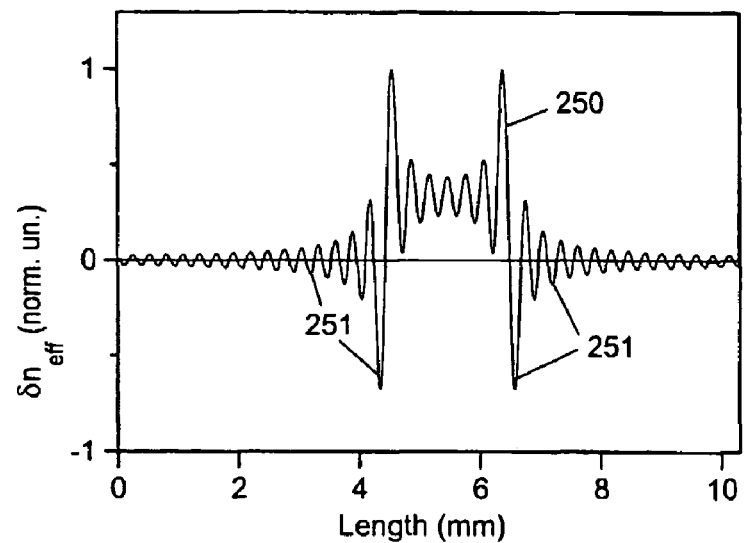

If the input signal were an impulse, then the modulation profile of the SSFBG and the temporal-profile of the output signal would be identical. However, because of the finite duration of the input pulses 230, both the shapes of the target signal 231 y(t) (or Y(ω)) and the input signal 230 x(t) (or X(ω)) need to be taken into account during the SSFBG design process. The required response of the grating 11 in the frequency domain H(ω) can be calculated from Eqn. 4 as the quotient of the output frequency spectrum 221 Y(ω) (desired) to the input frequency spectrum 220 of the ideal soliton pulses 230 X(ω). A plot of the desired reflectivity response 240 is shown in FIG. 24 by the dashed line. The corresponding refractive index superstructure 250 of the grating 11 required to achieve the response 240 is obtained from inverting Eqn. 1 and is shown in FIG. 25. The detailed structure of the desired reflectivity response 240 highlights the precision required of the grating writing process. Note that the sections of negative induced index 251 are achieved by putting additional discrete positive and negative phase shifts 241, 242 into the structure 250 such that a positive index change from the base line level can be used over the entire length of the grating 11—see for example M. Ibsen, M. K. Durkin, M. J. Cole, and R. I. Laming, "Optimised rectangular passband fibre Bragg grating filter with in-band flat group delay response", Electron. Lett., vol. 34, pp. 800–802, 1998. The length of the grating in the time domain was t=100 ps, corresponding to a grating length of 0.5·t·c/n =10.3 mm.

The sensitivity of the shaping operation to a variety of non-ideal optical excitation conditions and grating fabrication defects was then tested numerically. By non-ideal we mean differing in some regard from the design input pulse form 230.

Figure 27:
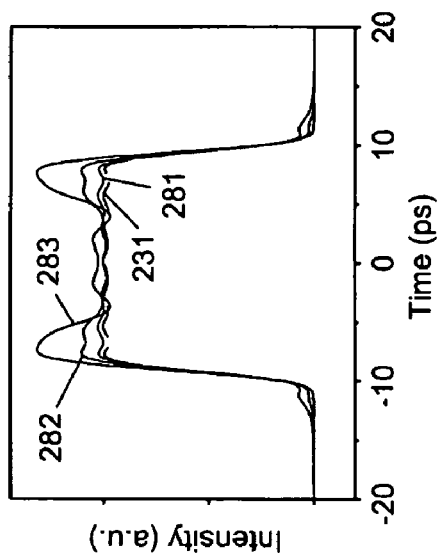

Firstly, the effect of using pulses with a soliton pulse shape, but a duration differing from the duration used for the SSFBG design 250 was investigated. FIG. 27 shows the intensity 271, 272, 273 for soliton pulses of widths 2.0 ps, 2.3 ps, and 3.0 ps respectively. The dashed line is the intensity 231 representing the intensity of the 2.5 ps soliton pulse input described with reference to FIG. 23. The analysis showed that small (+/−20%) departures of the pulse width from the ideal 2.5 ps affected the trade-off between ripple strength and rise/fall times.

Specifically, the ringing structure on the filtered pulses becomes more dominant for shorter pulses, whereas for wider pulses the rising and falling edges of the output pulses become less sharp and they begin to lose their flat-top nature. This behaviour can be understood by visualizing the signals in the frequency domain. The result of using shorter pulses, which exhibit a wider bandwidth, is to partially cancel out the apodization. Similarly, using broader pulses, which exhibit a narrower bandwidth, imposes additional apodization on the output pulses.

Figure 28:
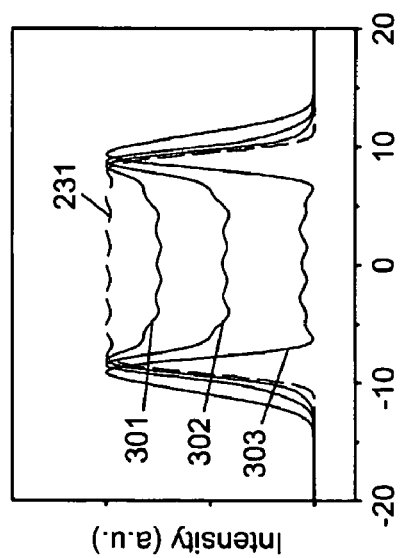

Secondly, the use of pulses with the desired width but with pulse shapes that differ significantly from the desired transform limited soliton form 230 was investigated. The pulses used to generate the responses shown in FIG. 28 correspond to 2.5 ps linearly chirped soliton pulses with a different chirp parameter C as defined below:

$$x(t) = \sec h\left(\frac{1.763t}{\Delta T}\right) \cdot e^{-j\frac{1.554Ct^2}{\Delta T^2}} \quad \text{(Eq. 6)}$$

where $\Delta T$ is the full width half maximum FWHM of the pulses. FIG. 28 shows the output pulses 281, 282, 283 corresponding to 2.5 ps chirped soliton pulses with C=0.1, TBP=0.342; C=0.2, TBP=0.420; and C=0.45, TBP=0.518, respectively. The dashed line is the intensity 231 representing the intensity of the 2.5 ps soliton pulse input described with reference to FIG. 23. The performance of the filter is seen to be reasonably good for relatively small amounts of chirp (C≦0.1), however for more extreme chirps the pulse deformation becomes more severe and spikes begin to develop at the leading and trailing edges.

Figure 29:
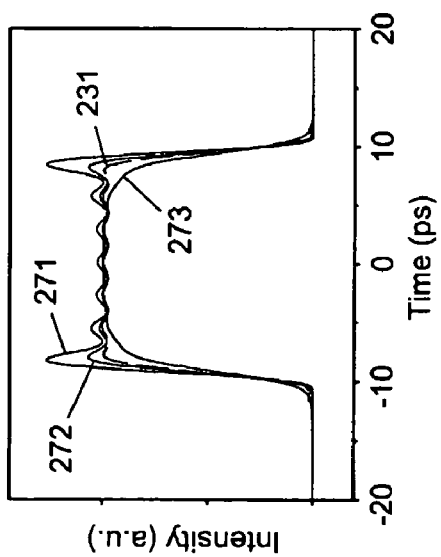

FIG. 29 shows the output pulses 291, 292 corresponding to transform-limited Gaussian input pulses of widths 2.5 ps and 3.55 ps respectively. The dashed line is the intensity 231 representing the intensity of the 2.5 ps soliton pulse input described with reference to FIG. 23. Gaussian pulses are characterized by a wider spectrum than those of soliton pulses of the same FWHM. For 2.5 ps Gaussian input pulses the deformation of the filtered output is quite significant and is characterized by the formation of sharp spikes on the pulse edges. By contrast the response 292 closely resembles the idealized case 231 when Gaussian pulses with the same 3 dB spectral width as a 2.5 ps soliton are used: the pulse duration in this instance is 3.55 ps. There is however a slight compromise in the rise and fall times, and the pulses exhibit slight spikes close to the edges.

Figure 30:
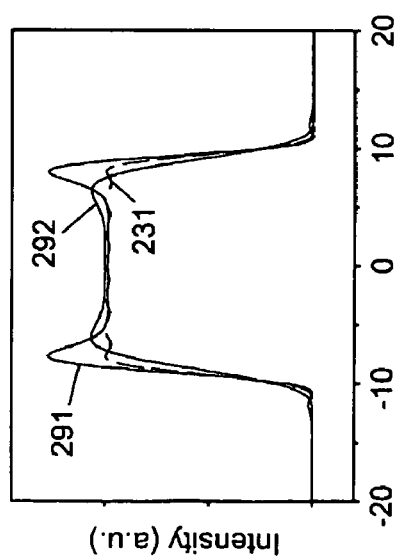

The SSFBG used in the analysis had a central reflecting wavelength of 1550 nm. FIG. 30 shows the effect of a mismatch between the central wavelength of the SSFBG to that of the incoming 2.5 ps soliton pulses. Pulse 301 corresponds to a mismatch of 0.4 nm, pulse 302 to a mismatch of 0.7 nm, and pulse 303 to a mismatch of 1.4 nm. The dashed line is the intensity 231 representing the intensity of the 2.5 ps soliton pulse input described with reference to FIG. 23 ie with no wavelength mismatch. Significant distortion of the pulses only becomes evident for wavelength mismatches greater than ~0.3 nm, and again manifests itself as the formation of dominant spikes at the pulse edges. Moreover, the intensity of the central part of the pulse is decreased. For more extreme mismatch cases (e.g. 1.5 nm) the spike formation is so severe that the reflected waveform effectively divides into two distinct pulses. It is therefore preferable that the mismatch is less than 0.3 nm for an SSFBG having a central reflecting wavelength in the range from around 1500 nm to around 1650 nm.

Figure 32:
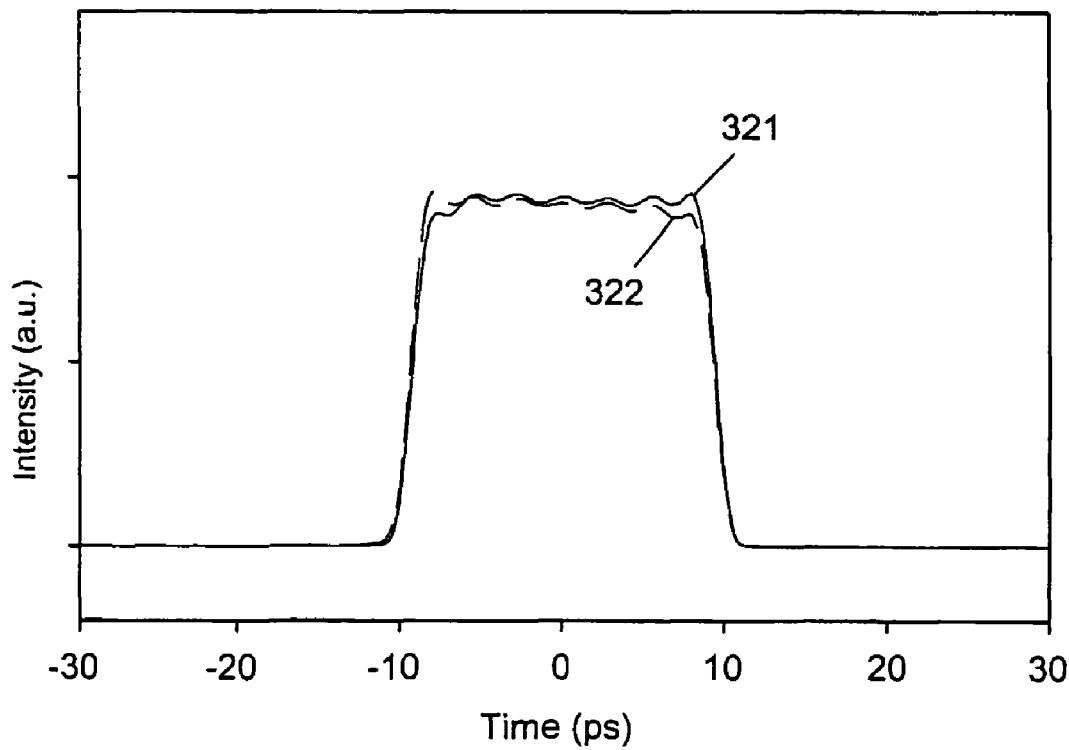
FIGS. 32 to 39 show experimental and theoretical results on the performance of a rectangular pulse shaping filter according to the present invention.

Finally, the effect that potential imperfections in the SSFBG structure could have on the shaping action was investigated numerically. Grating imperfections can arise either due to errors associated with the UV exposure itself (e.g. laser power fluctuations, phase mask errors), or from small variations in the fibre core diameter. Such imperfections manifest themselves as both phase and amplitude errors in the complex SSFBG superstructure function. It is difficult to estimate reliably the contribution of these imperfections. However, in order to gain an insight, their effect was simulated by adding noise (both phase and amplitude) to the SSFBG refractive index profile 250. For the purpose of the calculations, the phase and amplitude noise was assumed to be independent of each other, and to be randomly distributed along the grating length subject to a normal distribution with well defined mean and variance. The local values of the ideal grating superstructure function 250 were mathematically modified by:

$$A_n(x) = |A_0(x)| \cdot n_1(x) \cdot e^{-j(\arg(A_0(x)) + 2\pi n_2(x))} \quad \text{(Eq. 7)}$$

where $A_0(x)$ is the ideal superstructure function, and $n_1(x)$ and $n_2(x)$ are the random amplitude and phase noise parameters respectively. The temporal shapes of two extreme cases of distorted pulses 321, 322 are shown in FIG. 32 where the noise was added from a computer-generated noise function. The value of the phase noise parameter $n_2(x)$ used for both the pulses 321, 322 had a mean value of 0 and a standard deviation of 0.04, whereas the amplitude noise $n_1(x)$ for both the pulses 321, 322 was ascribed a mean value of 1 and a standard deviation of 0.02. Note that these values of standard deviation should be considered as extremely large for such a short FBG and the "continuous grating writing" technique employed. However, even with such a large noise contribution it can be seen that its effects are still somewhat minimal, further confirming the robustness of the shaping action.

Examining the various individual plots presented in FIGS. 27 to 30 and 32, it is clear that the shaping mechanism is reasonably robust and not particularly sensitive to the precise pulse excitation parameters, or small deviations in grating design. Indeed all of the estimated tolerances are well within readily achievable experimental limits, as demonstrated below.

Figure 26:
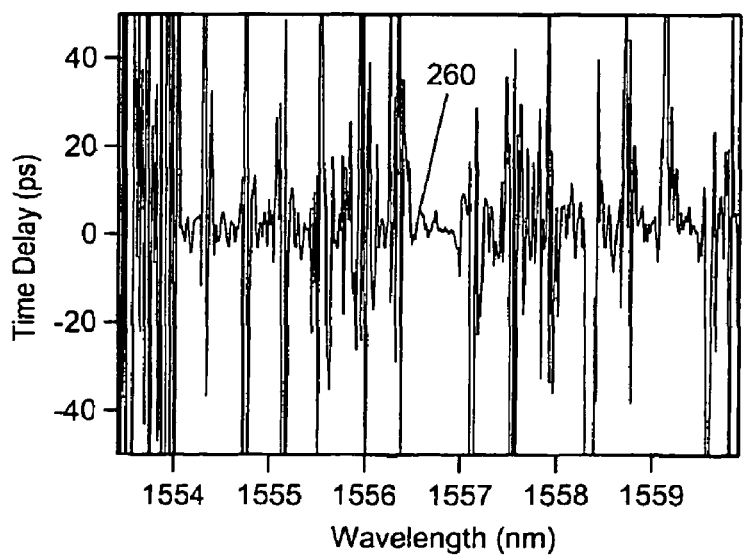
Figure 31:
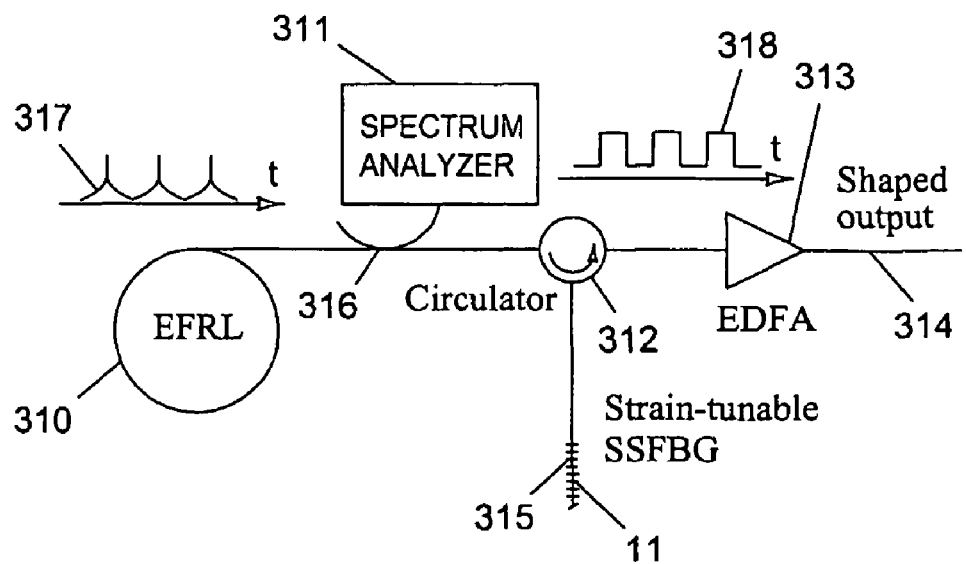
FIG. 31 shows apparatus according to the present invention comprising a mode locked ring laser.
Figure 33:
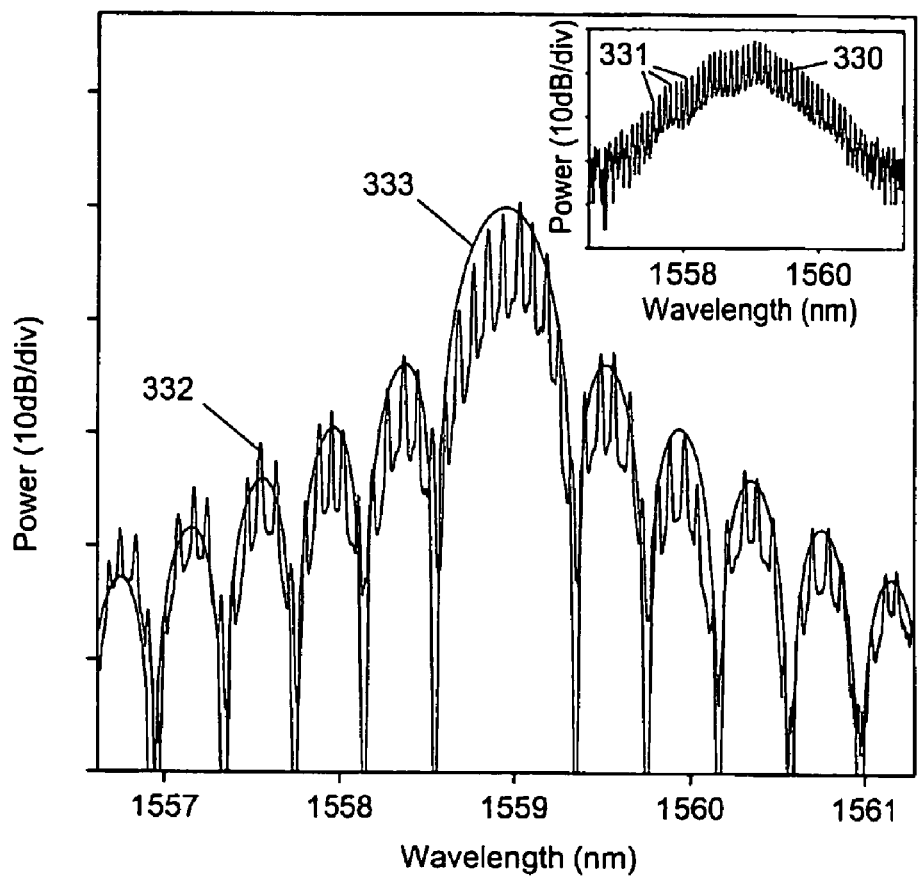
Figure 34:
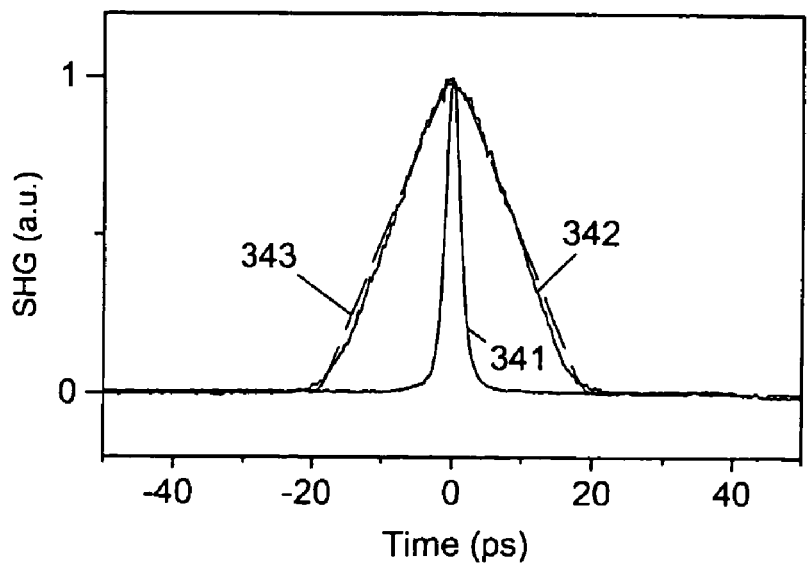

The experimental set up used is shown in FIG. 31. An all-polarization-maintaining harmonically mode-locked erbium fibre ring laser EFRL 310 operating at a repetition rate of 10 GHz was used to generate 2.5 ps soliton pulses 317 which could be monitored by a spectrum analyser 311 via a coupler 316. The grating 11 was a strain-tunable SSFBG 315 which output the reflected pulses 318 via a circulator 312. These were amplified by an erbium doped fibre amplifier (EDFA) 313 to produce a shaped output 314. For further details of the design of the EFRL see B. C. Thomsen, P. Petropoulos, H. L. Offerhaus, D. J. Richardson, and J. D. Harvey, "Characterization of a 10 GHz harmonically mode-locked erbium fibre ring laser using second harmonic generation frequency resolved optical gating", Technical Digest CLEO '99, Baltimore, 23–28 May 1999, paper CTuJ5. The central wavelength of the laser 310 was tunable through the use of an intra-cavity band-pass filter (not shown). The inset of FIG. 33 shows the optical spectrum 330 of the pulses—these have a 3 dB bandwidth of 1.0 nm. The input spectrum is composed of discrete, essentially infinitely narrow spectral lines 331 separated by ~0.08 nm corresponding to the signal repetition rate—these lines are clearly resolved in this high-resolution scan (resolution: ~25 pm). The corresponding autocorrelation trace of the input pulses is shown in FIG. 34, which compares the measured autocorrelation trace 341 of the 2.5 ps soliton pulses 317, the measured autocorrelation trace 342 of the reflected pulses 318, with the calculated autocorrelation function 343 (dashed line) of the rectangular pulses 231. It is seen that the soliton pulses have a FWHM of 2.5 ps. This yields an estimated time-bandwidth product (TBP) of ~0.32 giving confidence that the pulses are indeed close to transform-limited solitons. The pulses were launched through a short length of fibre onto the SSFBG 315 via the 3-port optical circulator 312. The resulting pulse shaping effects upon reflection from the SSFBG 315 were investigated in the time and frequency domains at the circulator output port. The SSFBG 315 was mounted on a rig to allow for fine strain-tuning of its central wavelength relative to that of the laser 310. The SSFBG 315 was written in a 0.12NA germano-silicate fibre with a 100 mW, 244 nm CW UV-source using the "continuous grating fabrication technique" as described in U.S. Pat. No. 6,072,926, which is hereby incorporated herein by reference. The fabrication technique effectively writes grating plane by grating plane, and apodization is obtained by dephasing one grating period with respect to the next one, or in other words by filling up the gaps between the grating planes to effectively reduce the index depth n, at the same time keeping the average refractive index $n_{ave}$ constant. To obtain full control of the apodization, the gratings are fabricated in the regime, where the index changes in a linear fashion with fluence. An interferometer is used to monitor the position of the fibre during writing to ensure that the individual grating planes are written with a position accuracy of ~1.0 nm. The peak reflectivity of the grating was kept relatively low (~10%) to ensure that operation within the Fourier limit. Based on this figure, the energy efficiency of the whole pulse shaping system was calculated to be ~3.5%. A plot of the amplitude and time delay response 243, 260 of the resulting SSFBG 315 is shown in FIGS. 24 and 26 respectively, as measured with an optical network analyzer. In FIG. 24, the dashed line shows the calculated spectral response 240 of the structure designed. The agreement with the experimentally measured amplitude response 243 is seen to be excellent. Direct evidence for the discrete phase jumps between the individual reflectivity lobes of the grating is given by the observation of sharp features in the time delay response 260 at the lobe edges as seen in FIG. 26. The flatness of the time delay response 260 within the lobe pass band, albeit limited by system measurement noise/resolution, also provides a good indication of a uniform phase response across the main body of the individual lobes as desired.

The measured power spectrum 332 of the reflected pulses 318 is shown in FIG. 33. This is compared to the spectrum 333 of the single rectangular pulse 231 expected from the design procedure. There is a very good agreement between the envelopes of the two spectra even at levels ~25 dB below the main spectral peak. (The distinct spectral lines of the experimental trace arise from the high repetition rate of the signal, which was not taken into account on the calculated filter response and are readily resolved by the spectrum analyzer). The temporal shape of the reflected pulses 318 was initially evaluated using an autocorrelator. The intensity autocorrelation function of a rectangular pulse of duration T is a triangular pulse of total duration 2 T. FIG. 34 shows the measured autocorrelation trace 342 of the reflected pulses 318, the calculated autocorrelation function 343 of the targeted waveform 318, and an autocorrelation trace 341 of the input pulses 317. The shaping action of the SSFBG can easily be appreciated. The full width of the triangular autocorrelation function 342 is approximately 40 ps as expected for a 20 ps pulse form.

To establish the quality of the shaping more directly measurements were conducted using an optical sampling oscilloscope. The system used an electroabsorption modulator and an electronically driven delay circuit to sample the optical signal at delayed times relative to the fixed RF drive to the laser—for a fuller explanation of the technique, see A. D. Ellis, J. K. Lucek, D. Pitcher, D. G. Moodie, and D. Cotter, "Full 10×10 Gbit/s OTDM data generation and demultiplexing using electroabsorption modulators", Electron. Lett., vol. 34, pp. 1766–1767, 1998.

Figure 35:
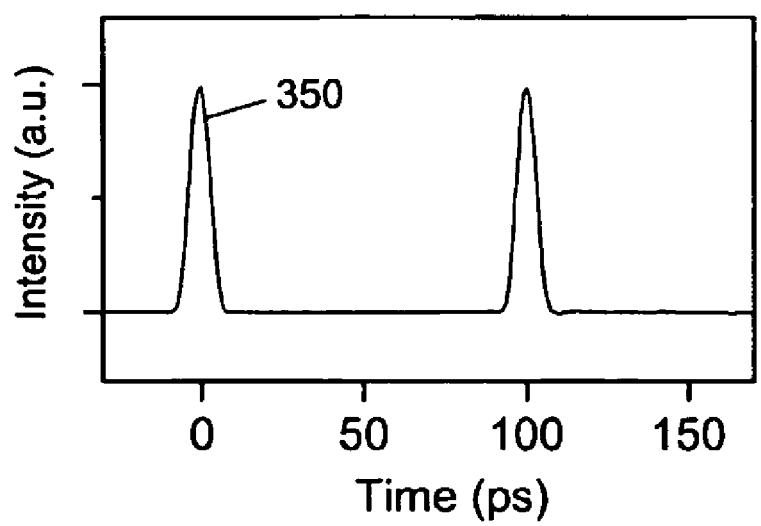
Figure 36:
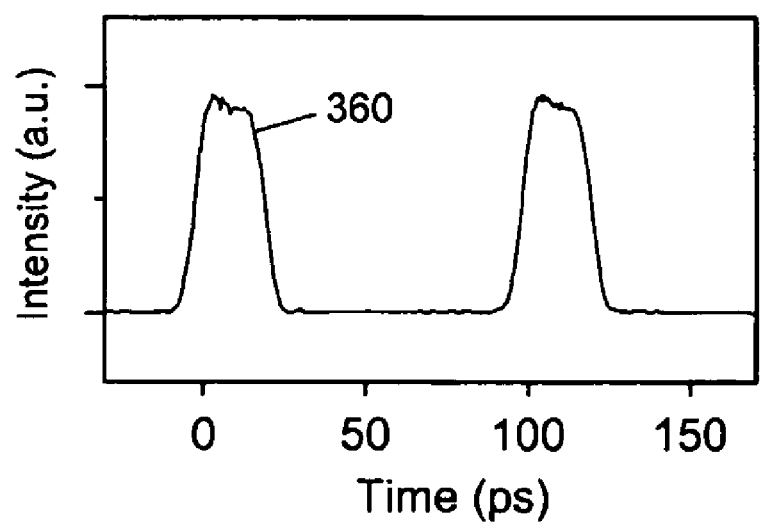

FIG. 35 shows measured optical sampling oscilloscope traces 350 of the input pulses 317 and FIG. 36 shows measured optical sampling oscilloscope traces 360 of the reflected pulses 318. The resolution of the oscilloscope was approximately 7 ps as determined by measurements of the incident 2.5 ps pulse forms shown in FIG. 35. The measurements show that the reflected pulse 318 has a substantially rectangular pulse shape. An accurate estimate of the rise and fall times on the pulse is limited by the 7 ps temporal resolution of the measurement apparatus. There appears to be slight amplitude variation (approximately 5–10%) across the top of the pulses 360. At this stage it is not yet established whether this variation is due to grating imperfections, or is an artifact of the optical sampling scope set up. Nevertheless, the main targets of the shaping operation, i.e. the generation of an almost flat top and sharp edges, are clearly demonstrated.

Figure 37:
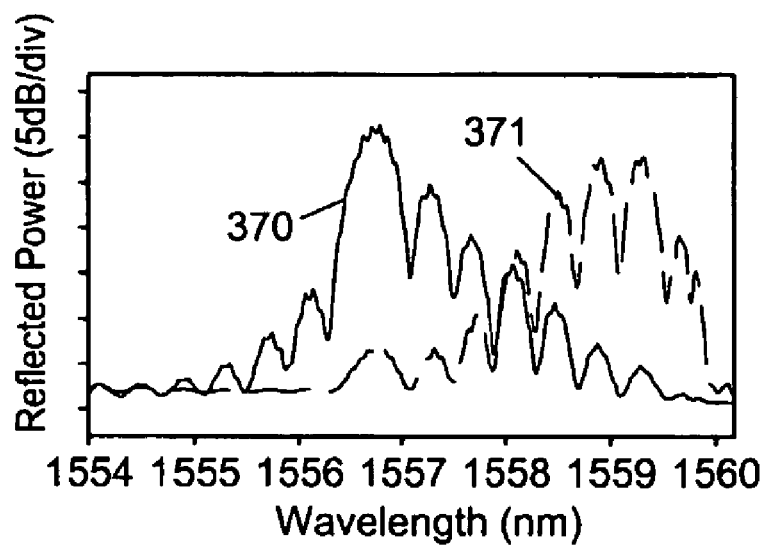
Figure 38:
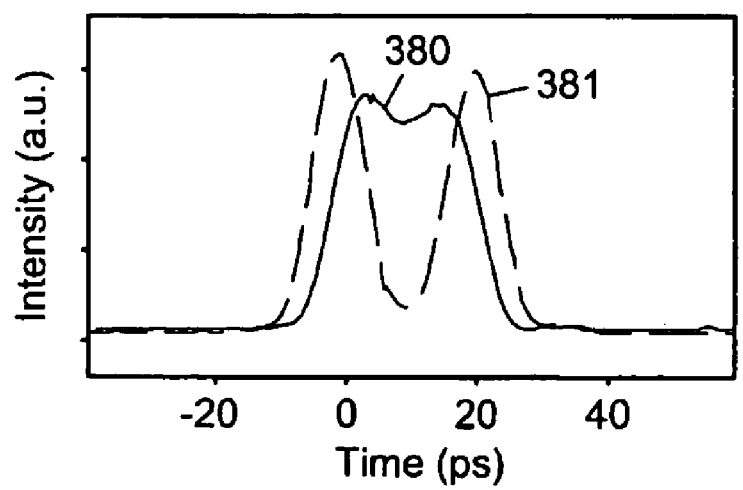

In additional experiments the central wavelength of the laser 310 was detuned relative to that of the SSFBG 315, and filtered signal 318 was diagnosed using the optical sampling oscilloscope and an optical spectrum analyzer. The results of these measurements are summarized in FIG. 37, which shows the measured power spectra 370, 371 for wavelength mismatches of 0.4 nm and 1.4 nm respectively, and in FIG. 38 which shows optical sampling oscilloscope traces 380, 381 for the wavelength mismatches of 0.4 nm and 1.4 nm respectively. The results shown in FIGS. 37 and 38 should be compared to the numerical calculations presented in FIG. 30 (taking into account of course the limited resolution of the optical oscilloscope). The two cases shown in FIGS. 37 and 38 are for an incoming signal of central wavelength 0.4 and 1.4 nm away from the central wavelength of the SSFBG 315 respectively. In both cases, the input pulses 317 were transform-limited solitons of 2.5 ps duration. The general behaviour predicted in FIG. 30 is confirmed here, with the central part of the pulse decreasing, until the pulse splits into two parts.

Figure 39:
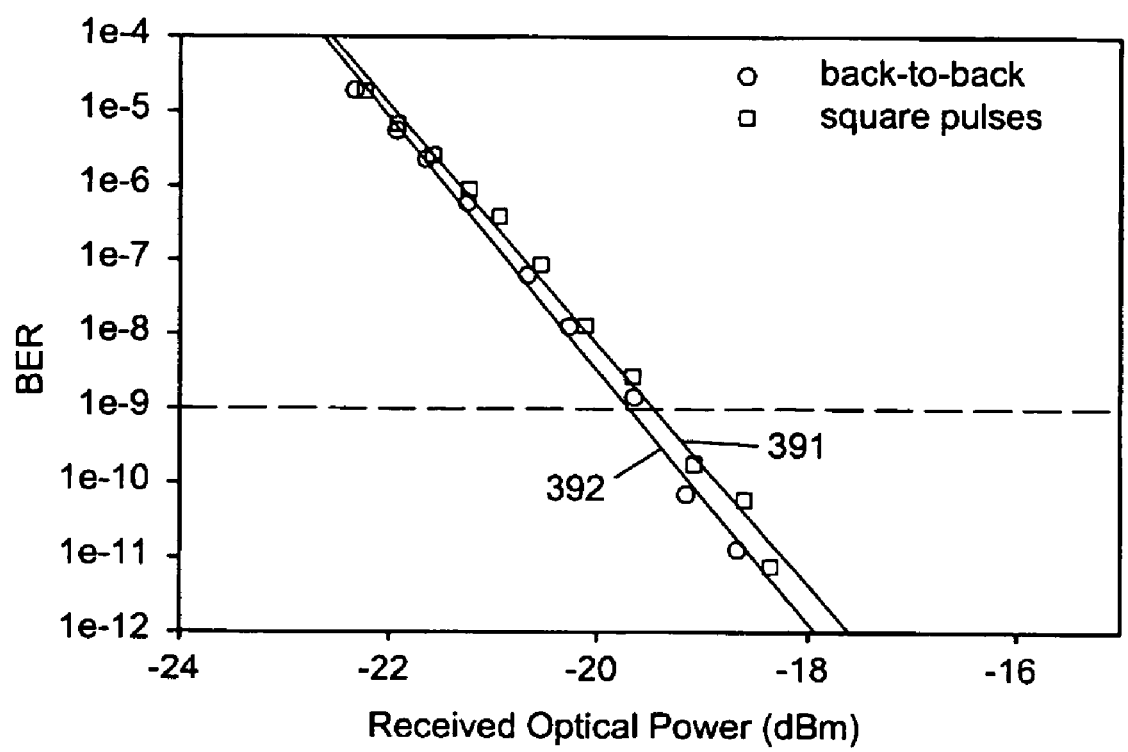

With reference to FIG. 31, Bit-Error-Rate (BER) measurements were performed at 10 Gbit/s using the rectangular pulses 318. For these measurements, the laser 310 was operated at the central wavelength of the SSFBG 315 and produced transform-limited 2.5 ps soliton pulses 317. The 10 GHz laser signal 317 was modulated using a $2^{31}-1$ pseudorandom bit sequence before being coupled onto the SSFBG 315. The reflected signal 318 was detected using a commercial 10 Gbit/s RZ photoreceiver and fed to the BER tester. The BER measurements are summarized in FIG. 39. Curve 391 shows the BER measurements using the rectangular pulses 318, and curve 392 shows BER measurements taken with the soliton pulses 317 without passing the soliton pulses 317 through the SSFBG 315 (so called back-to-back measurements). The results indicate that essentially error free operation was readily achieved down to the $10^{-11}$ level, with only a slight (<0.5 dB) power penalty relative to the back-to-back measurements.

The utility of producing high-quality, soliton to rectangular pulse conversion using reflection from a complex superstructure grating with an appropriately designed amplitude and phase response has clearly been demonstrated and the achieved performance are in good agreement with theory. In addition, the tolerance of the proposed scheme to various non-ideal excitation conditions, and to random grating writing errors have been demonstrated to be reasonably robust on both counts. The results highlight the capability of advanced grating writing technology for use in pulse shaping applications within the communications arena.

Figure 40:
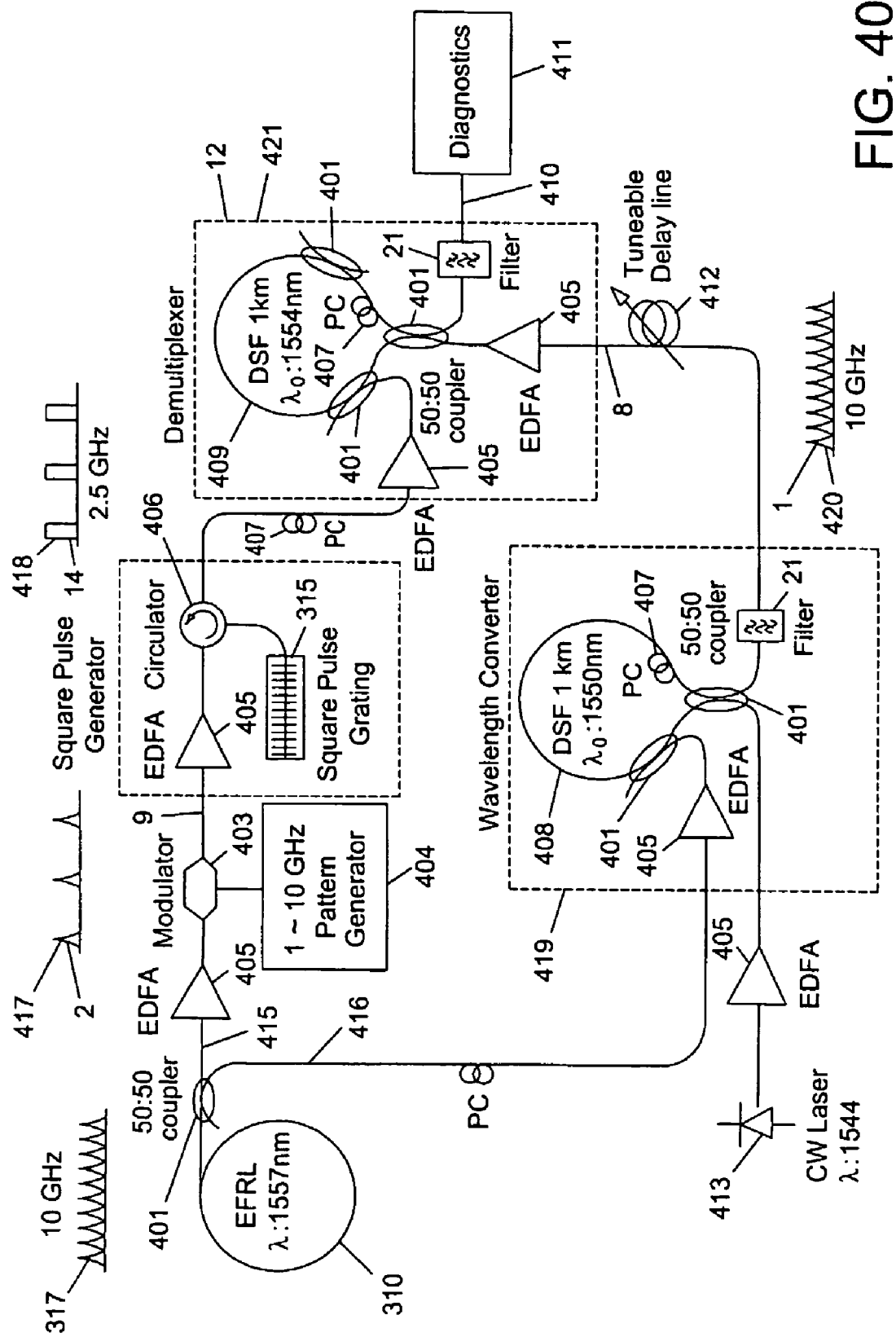
FIG. 40 shows a test set up for characterizing apparatus according to the present invention.

The experimental set up shown in FIG. 40 was used to demonstrate the use of the SSFBG 315 described above in non-linear switching applications. The set up comprises the 2.5 ps, 10 GHz, regeneratively mode locked erbium fibre ring laser (EFRL) 310, 50:50 couplers 401, erbium doped fibre amplifiers (EDFA) 405, a modulator 403 driven by a pattern generator 404, a circulator 406, the grating 315, polarization controllers 407, 1 km of dispersion shifted fibre 408 having a zero dispersion wavelength of 1550 nm, 1 km of dispersion shifted fibre 409 having a zero dispersion wavelength of 1554 nm, an output port 410, diagnostics 411, a tuneable delay line 412, and a continuous wave laser 413.

The 2.5 ps 10 GHz solitons 317 from the EFRL 310 had a wavelength of 1557 nm. The solitons 317 were separated into a first and a second channel 415 and 416. The first channel was modulated by the modulator 403 driven by the 1 to 10 GHz pattern generator to provide a pseudorandom data sequence 417 of 2.5 ps pulses at 2.5 Gbit/s. These pulses were then fed onto the pulse-shaping SSFBG 315 which was fabricated with the correct phase and amplitude reflectivity profile to convert the 2.5 ps solitons into 20 ps rectangular pulses 418.

The second channel 416 was first amplified and then fed to the control port of a dual-wavelength NOLM 419, which was employed as a wavelength converter. The NOLM 419 incorporated a 1 km long dispersion shifted fibre DSF 408 with a zero dispersion wavelength of $\lambda_0$=1550 nm. The NOLM 419 acted as a non-linear switch that enabled the output of a continuous-wave DFB laser 413 operating at 1544 nm to be modulated using the 1557 nm control pulses 317. By appropriately setting the loss and polarization of light within the NOLM 419, and filtering out the 1557 nm control pulses at the output of the NOLM 419, a 10 GHz train of high-quality, 3.5 ps pulses 420 at 1544 nm was obtained. Importantly, for this demonstration this 10 GHz wavelength-shifted pulse train 420 was synchronized to the 2.5 Gbit/s data stream 418 generated within the first channel 415.

Figure 41:
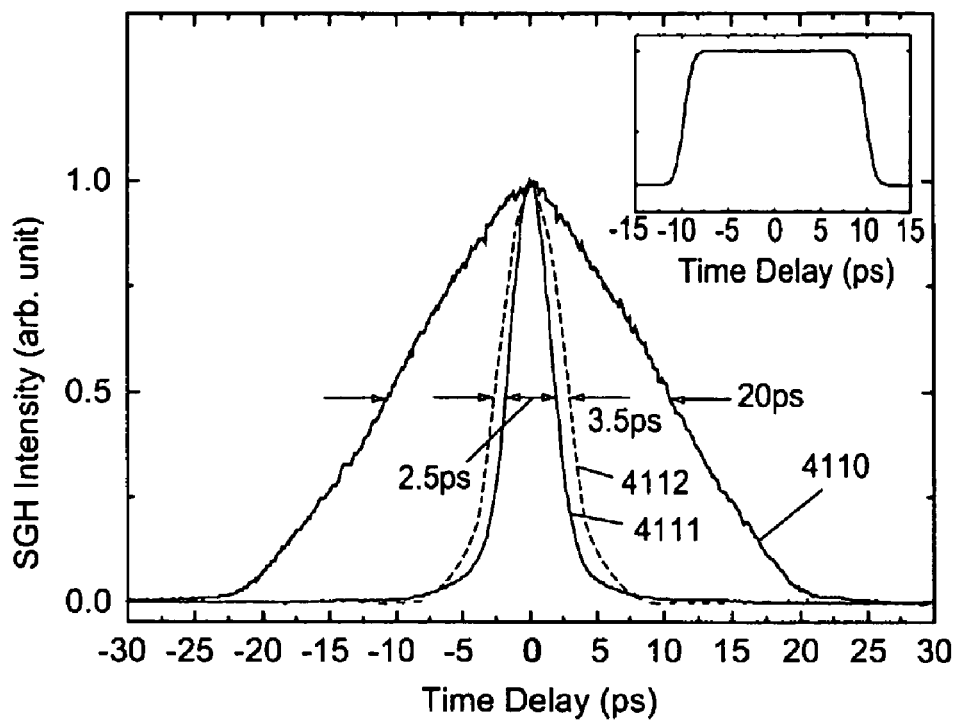
FIGS. 41 to 44 show theoretical and experimental performance of apparatus according to the present invention.
Figure 42:
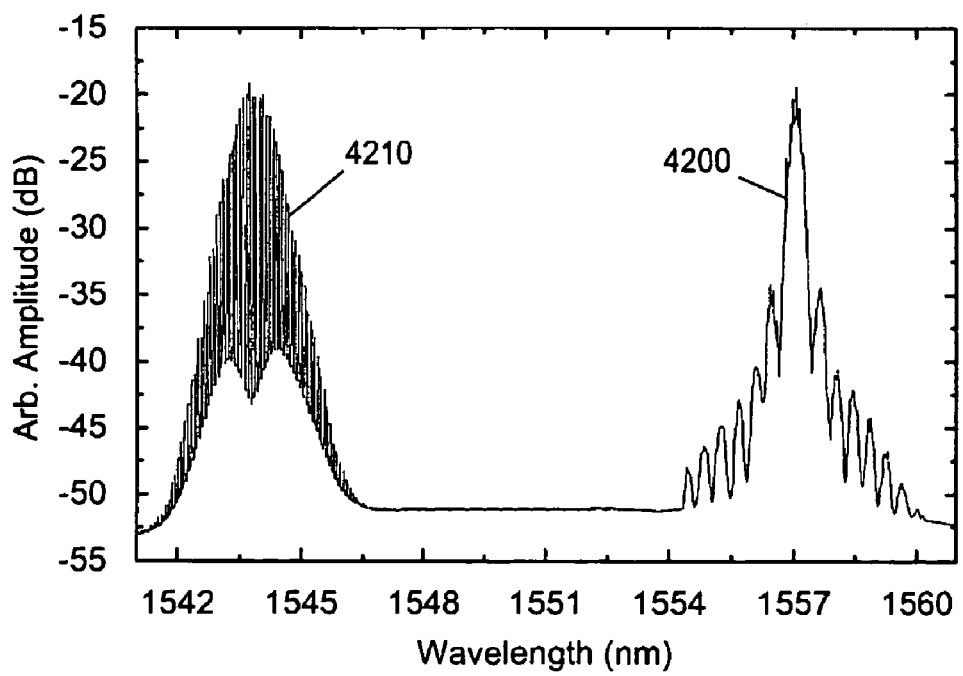

FIG. 41 shows the measured triangular autocorrelation profiles 4100, 4111, 4112 of the pulses 418, 417 and 420 respectively. FIG. 42 shows the optical spectra 4200, 4210 of the pulses 418 and 420 respectively. Having generated these two synchronized pulse streams 418, 420, at two different wavelengths and two different pulse repetition frequencies, the characteristics were measured of the NOLM 421 when controlled by the 2.5 Gbit/s, 20 ps 1557 nm rectangular pulses 418 and the 2.5 ps 1557 nm soliton pulses 317 respectively (ie with SSFBG 315 and without the SSFBG 315 respectively).

For certain implementation of the jitter tolerant switch it is necessary to control the polarisation state of the pulses incident on the SSFBG 315 since it is possible to get a different impulse response for orthogonal polarisation components if the fibre used to manufacture the SSFBG is birefringent (either inherently, or due to the grating writing process), and this can degrade the performance of the switch. Usually this achieved by placing a polarisation controller somewhere in the optical path to the SSFBG 315. Also note that often the response of the non-linear switch itself is polarisation dependent. In certain instance it is desirable for signals 1 and 2 (here represented by signals 418 and 420) to be co-polarised when incident to the switch, in other instances it is preferable that they are cross-polarised. Again additional polarisation controllers may be required within the circuit to ensure that suitable polarisation alignment can be achieved.

Figure 49:
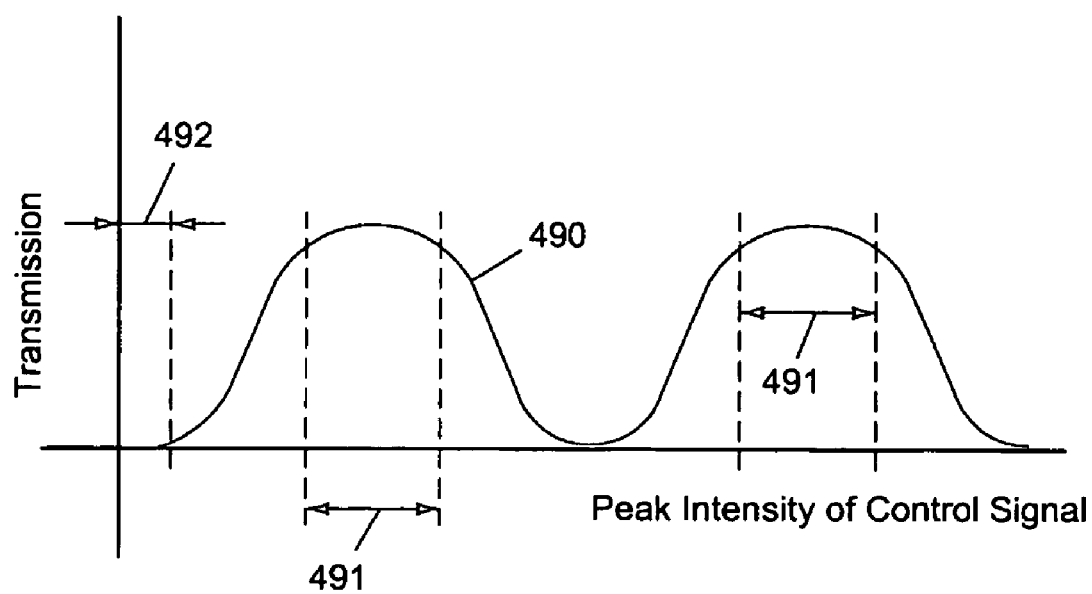
FIG. 49 shows a typical transmission response of a fibre-based non-linear optical device.

FIG. 49 shows the transmission characteristics 490 of a typical fibre-based non-linear optical device as a function of peak intensity of the control signal that controls the switching. The characteristic 490 has a nonlinear intensity transmission response with a first operating range 491 over which the transmission changes little with peak intensity, and a second operating range 492 over which the transmission remains low for a substantial peak intensity range. Such a characteristic can provide amplitude noise suppression and optical thresholding when used as the non-linear optical device 12 particularly when a rectangular control pulse is utilized that operates the non-linear optical device 12 between the first and the second operating ranges 491, 492.

The first switch investigated was the dual-wavelength NOLM 421. In this instance however, the control signal was now a data-modulated signal 417, and the signal to be switched was a 10 GHz train of 3.5 ps 1544 nm optical pulses 420. The system thus operated in this instance as an all-optical modulator in this configuration and which for convenience is sometimes referred to as an M-NOLM. Note that by reversing the input and control signals 417 and 420 the system can be re-configured to act as an all-optical demultiplexer. The 1544 nm pulse train 420 incident to the switch was first passed through a tunable delay line 412 to allow the relative arrival time of the 1544 nm pulses 420 relative to the rectangular control pulses 418 to be adjusted. By adjusting and measuring this relative arrival time delay and monitoring the loop output 410 at 1544 nm, (for a suitable control pulse power), we were able to determine the switching window of the device and to establish its sensitivity to timing-jitter.

Figure 43:
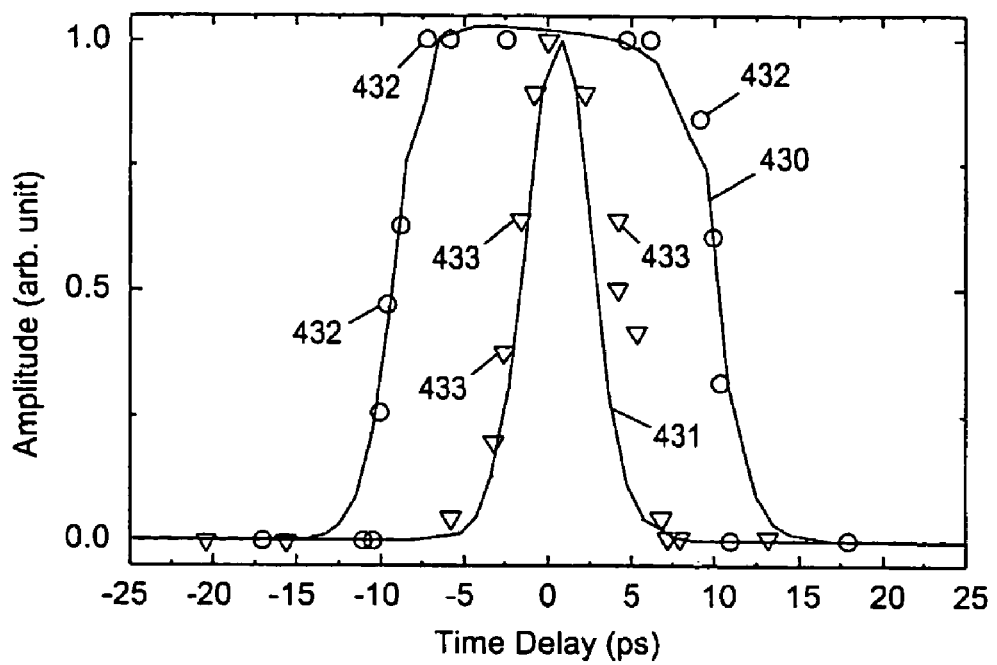

FIG. 43 shows the theoretically predicted switching window 430 and the experimentally observed switching window 432 of the NOLM 421 driven with the 20 ps rectangular pulses 418. These are compared with the theoretically predicted switching window 431 and the experimentally observed switching window 433 of the NOLM 421 driven with the 2.5 ps control pulses 417 (ie without the SSFBG 315 in place). A good rectangular switching characteristic 430 with a 3 dB width of 20 ps is obtained using the rectangular control pulses as opposed to a value of 4 ps when driving the switch without the SSFBG 315. Note the slight asymmetry in the switching window that is both predicted theoretically and observed experimentally. This arises from pulse walk-off effects between the pump and probe beams within the NOLM 421. The effect though is small since the dispersion shifted fibre 409 used in the NOLM 421 had a length of only 1 km, a zero-dispersion wavelength of 1554 nm, and a dispersion slope of 0.07 ps/nm$^2$-km. These results show that we can expect to achieve around 5 times greater tolerance to timing-jitter by converting the control pulses to rectangular pulses in this instance.

Figure 44:
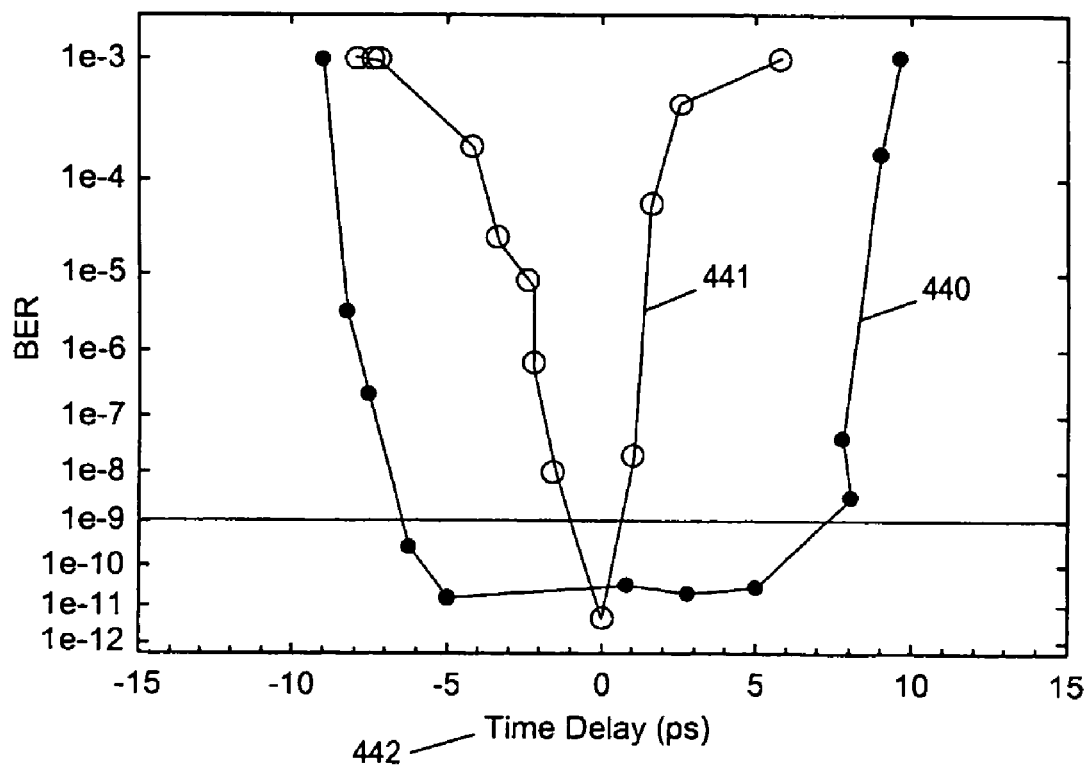

In order to confirm the system impact of using rectangular control pulses bit error rate BER measurements were performed on the NOLM 421 switch performance. These results are summarized in FIG. 44, which shows the BER 440, 441 versus time delay 442 when the NOLM 421 was driven by the rectangular pulses 418 and by the soliton pulses 417. The time delay 442 was varied with the tuneable delay line 412. Error-free, penalty-free performance was readily achieved over a +/−7 ps delay range for the rectangular pulse 418 driven NOLM 421 versus a +/−1 ps range for the NOLM 421 driven directly with the 2.5 ps laser pulses 417. No significant power penalties on BER for either the NOLM 419 or the NOLM 421 were observed.

Figure 45:
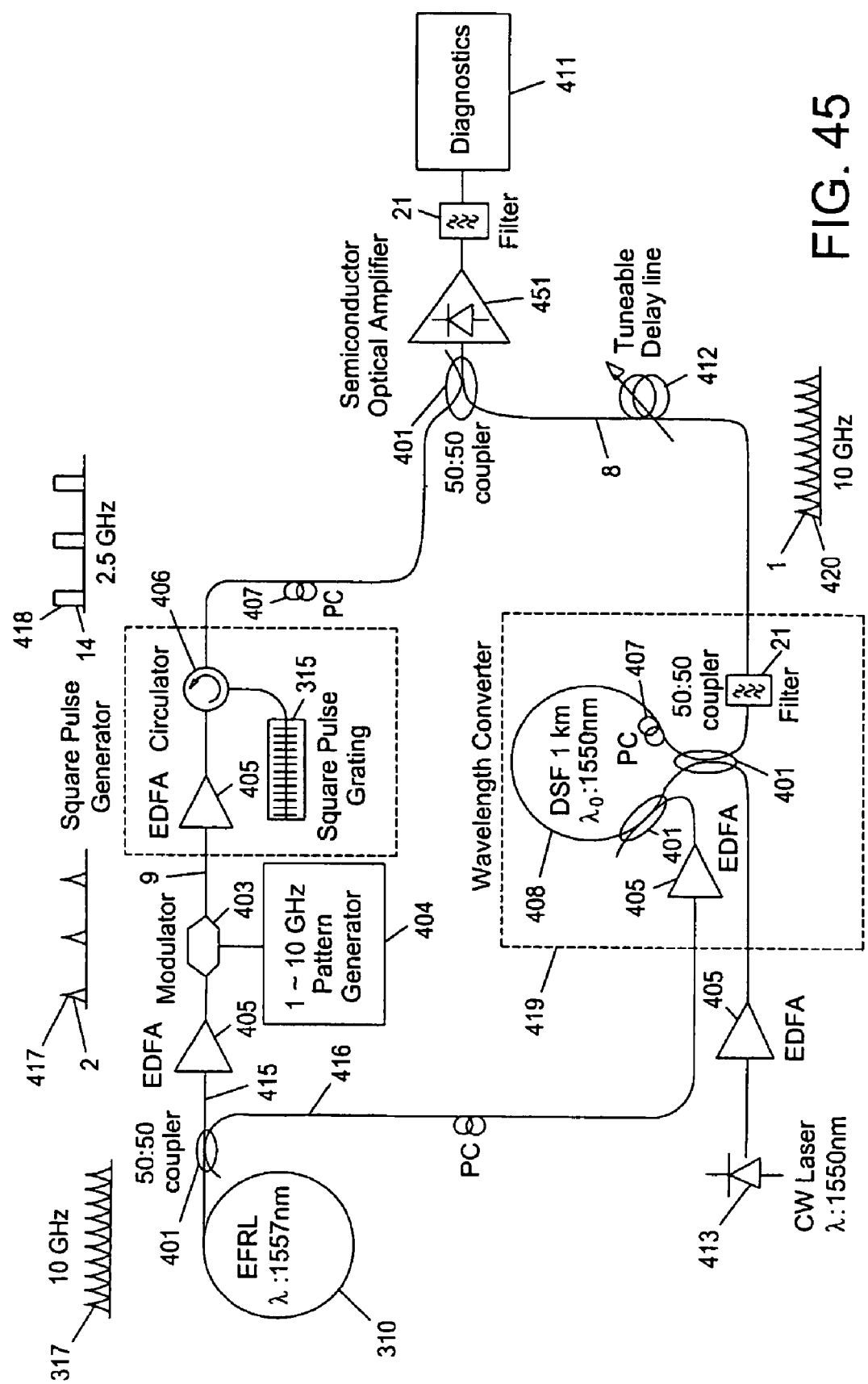
FIG. 45 shows a test set up for characterizing apparatus comprising a semiconductor optical amplifier according to the present invention.
Figure 46:
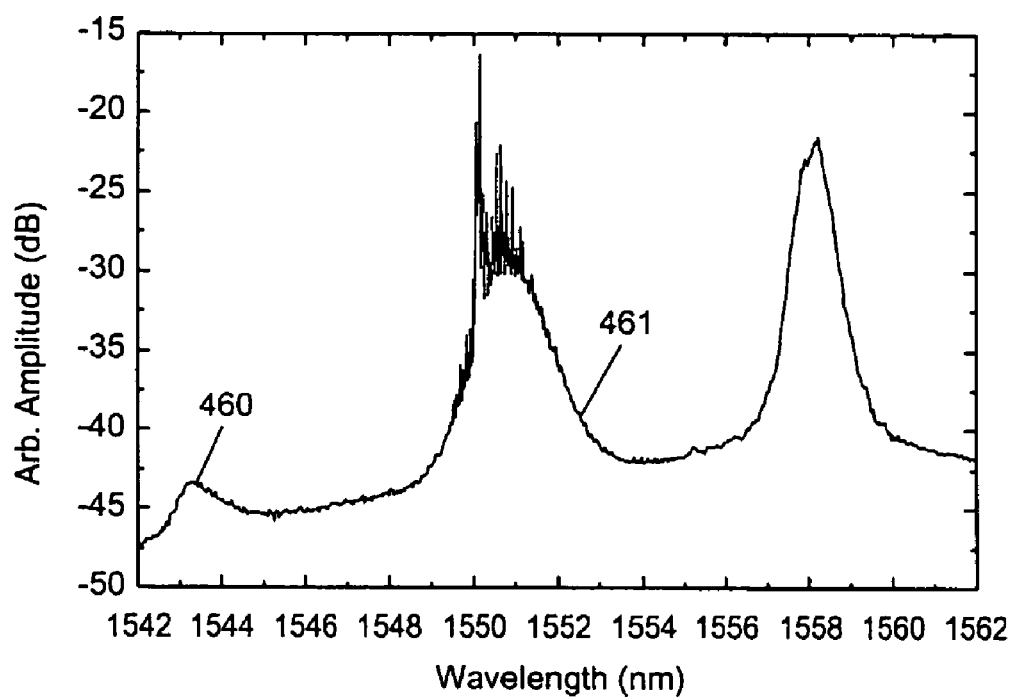
FIGS. 46 and 47 shows experimental results for the semiconductor optical amplifier.
Figure 47:
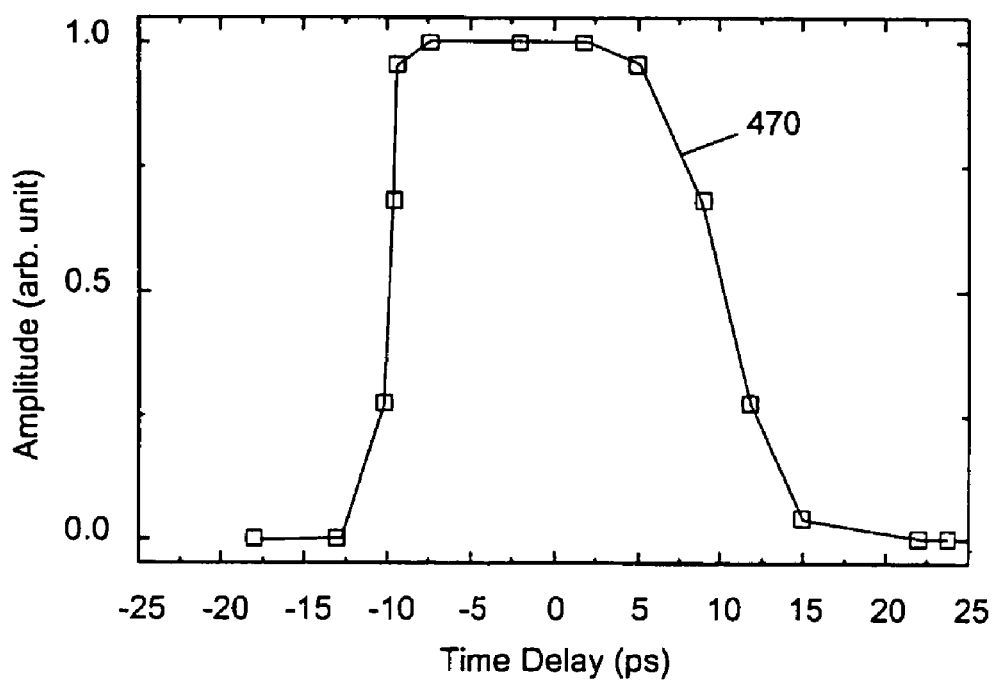

FIG. 45 shows the apparatus of FIG. 40 with the NOLM 421 replaced by a semiconductor amplifier SOA 451 which employs four-wave mixing as the optical switching mechanism. The experimental set up was essentially the same as that used for the NOLM 421. However it is to be appreciated that the optimum switching powers required for the SOA 451 based scheme (approximately 7 dBm average power at 10 Gbit/s) were substantially lower than those required for the NOLM 421 (approximately 15 dBm at 2.5 Gbit/s). Note also that we had to change the wavelength of the 10 GHz switching pulses from 1544 nm to 1550 nm to achieve an adequate phase matching condition and sufficient switched power. A demultiplexed four wave mixed signal 460 is observed at the wavelength of 1543 nm, as shown in the SOA output spectrum 461 of FIG. 46. FIG. 47 shows the experimentally measured switching window 470. As with the NOLM 421 an excellent rectangular switching window is obtained, allowing for timing jitter tolerance of +/−7 ps.

The above experiments demonstrate that SSFBGs can be used to reliably re-shape ultrashort optical pulses in order to provide more optimal and jitter-tolerant operation of non-linear optical switches based on both fibre and semiconductor non-linear components. This approach is particularly attractive for use with SOA based switching devices for which there is no ready way of shaping the switching window other than through direct control of the pulse shape.

The SSFBG approach represents an extremely powerful and flexible way of manipulating the temporal characteristics of pulses and that it could play an important role in future high-speed, high capacity optical communication systems and networks.

It is to be appreciated that the embodiments of the invention described above with reference to the accompanying drawings have been given by way of example only and that modifications and additional components may be provided to enhance the performance of the apparatus. In particular, planar waveguide components may advantageously replace fibre components in many of the embodiments and in particular with reference to FIGS. 15, 16, 17, 19 and 20.

The present invention extends to the above mentioned features taken singularly or in any combination.

The invention claimed is:

1. Apparatus for providing timing jitter tolerant optical modulation of a first signal by a second signal, the first signal having a first wavelength, the second signal comprising a plurality of second signal pulses having a second pulse shape and a second wavelength, the apparatus comprising a first signal input port, a second signal input port, a coupler, a grating and a non-linear optical device, the apparatus being configured to direct the second signal at the second signal input port to the non-linear optical device via the coupler and the grating, and to direct the first signal at the first signal input port to the non-linear optical device; the grating comprising a superstructured fibre Bragg grating that converts the second signal pulses into intermediary pulses each having an intermediary pulse shape; the intermediary pulse shape being such that it provides a switching window within the non-linear optical device.

2. The apparatus of claim 1, and wherein the first signal comprises a plurality of first signal pulses, the grating is defined by a grating impulse response, the intermediary pulse shape is defined by the convolution of the second pulse shape and the grating impulse response, and the switching window is a substantially rectangular switching window which provides tolerance to a variation in arrival time of the first signal pulse at the first input port and the second signal pulse at the second input port substantially equal to the width of the substantially rectangular switching window.

3. The apparatus of claim 1, and wherein the first signal comprises a plurality of first signal pulses, the grating is defined by a grating impulse response, the intermediary pulse shape is defined by the convolution of the second pulse shape and the grating impulse response, the grating being such that the intermediary pulse shape is a substantially rectangular pulse, and wherein the apparatus has a tolerance to a variation in arrival time of the first pulse at the first input port and the pulse at the second input port substantially equal to the width of the substantially rectangular pulse minus the width of the first signal pulse.

4. The apparatus of claim 1, and wherein which the coupler is one of a circulator or an optical fibre coupler.

5. The apparatus of claim 1, and further comprising an optical switch, the optical switch comprising the non-linear optical device.

6. The apparatus of claim 1, and further wherein the non-linear optical device is a holey fibre.

7. The apparatus of claim 6, and wherein the holey fibre comprises glass, and further wherein the glass is one of a silica, a silicate glass, or a compound glass.

8. The apparatus of claim 6, and wherein the holey fibre comprises a polymer.

9. The apparatus of claim 6, and wherein the holey fibre comprises a core and a cladding, the cladding comprises a plurality of holes arranged around the core, and the core has a diameter less than 10 um.

10. The apparatus of claim 9, and wherein the core has a diameter less than 5 um.

11. The apparatus of claim 9, and wherein the core has a diameter less than 2 um.

12. The apparatus of claim 6, and wherein the holey fibre comprises a dopant, and wherein the dopant is selected from the group comprising Ytterbium, Erbium, Neodymium, Praseodymium, Thulium, Samarium, Holmium Dysprosium, Tin, Germanium, Phosphorous, Aluminium, Boron, Antimony, Uranium, Gold, Silver, Bismuth, Lead, a transition metal, and a semiconductor.

13. The apparatus of claim 1, and wherein the non-linear optical device comprises a semiconductor optical amplifier.

14. The apparatus of claim 1, and wherein the non-linear optical device comprises one of a lithium niobate channel waveguide, or a lithium niobate planar waveguide.

15. The apparatus of claim 1, and wherein the non-linear optical device comprises one of a periodically poled lithium niobate channel waveguide or a periodically poled lithium niobate planar waveguide.

16. The apparatus of claim 1, and wherein the non-linear optical device is selected from the group comprising an optical switch, a holey fibre, a poled-fibre, a potassium titanyl phosphate (KTP) or other crystalline waveguide, a periodically poled KTP or other crystalline waveguide, a non-linear optical loop mirror, a Kerr gate, an optical fibre, a non-linear amplifying loop mirror, or a non-linear optical modulator.

17. The apparatus of claim 1, and wherein the apparatus is further configured to modulate the first signal.

18. The apparatus of claim 1, and wherein the apparatus is further configured to demultiplex the first signal.

19. The apparatus of claim 1, and further comprising an actively mode-locked fibre laser.

20. The apparatus of claim 1, and further comprising an interferometer comprising a first arm and a second arm, and wherein the first arm comprises the non-linear optical device.

21. The apparatus of claim 1, and further comprising a filter, and wherein the filter is a wavelength selective filter.

22. The apparatus of claim 1, and further comprising a polarizing element, and wherein the polarizing element is one of a polarizer or a polarization beam splitter.

23. The apparatus of claim 1, and further comprising a clock generator.

24. The apparatus of claim 23, and wherein the clock generator is a short-pulse generator selected from the group comprising a mode-locked fibre laser, an actively mode-locked fibre laser, a generator comprising an electro-absorption modulator and a laser, a generator comprising an electro-optic modulator and a laser, and a gain-switched laser diode.

25. The apparatus of claim 23, and wherein the clock generator comprises a means for pulse compression.

26. The apparatus of claim 25, and wherein the means for pulse compression comprises one of a dispersion compensator fibre, a chirped fibre Bragg grating, a dispersion decreasing fibre, an optical amplifier, a Raman amplifier, an optical switch, or an optical pulse compressor.

27. The apparatus of claim 1, and further comprising a plurality of non-linear optical devices, and wherein the apparatus is further configured to direct the second signal at the second signal input port to each of the non-linear optical devices.

28. The apparatus of claim 27, and wherein the apparatus is configured as an optical multiplexer.

29. The apparatus according of claim 27, and wherein the apparatus is configured as an optical demultiplexer.

30. The apparatus according of claim 27, and wherein the apparatus is configured as an inverse multiplexer.

31. The apparatus of claim 1, and further comprising a switch and a control input for controlling the switch.

* * * * *